US012739744B2

(12) United States Patent
Yamamoto et al.

(10) Patent No.: US 12,739,744 B2
(45) Date of Patent: Sep. 15, 2026

(54) TERMINAL AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Xuan Tuong Tran, Singapore (SG); Akihiko Nishio, Osaka (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 304 days.

(21) Appl. No.: 18/260,735

(22) PCT Filed: Sep. 10, 2021

(86) PCT No.: PCT/JP2021/033366
§ 371 (c)(1),
(2) Date: Jul. 7, 2023

(87) PCT Pub. No.: WO2022/153595
PCT Pub. Date: Jul. 21, 2022

(65) Prior Publication Data

US 2024/0056961 A1 Feb. 15, 2024

(30) Foreign Application Priority Data

Jan. 14, 2021 (JP) ................................ 2021-004451

(51) Int. Cl.
*H04W 4/00* (2018.01)
*H04W 48/16* (2009.01)
*H04W 48/20* (2009.01)

(52) U.S. Cl.
CPC .......... *H04W 48/20* (2013.01); *H04W 48/16* (2013.01)

(58) Field of Classification Search
CPC .............................. H04W 48/16; H04W 48/20
USPC ........................................................ 455/434
See application file for complete search history.

(56) References Cited

U.S. PATENT DOCUMENTS

2019/0222367 A1* 7/2019 Tseng ................ H04W 36/0069
2019/0319686 A1 10/2019 Chen, IV et al.
2020/0280889 A1 9/2020 Liu
2020/0280899 A1 9/2020 Zhang et al.
2020/0314913 A1 10/2020 Rastegardoost et al.
(Continued)

FOREIGN PATENT DOCUMENTS

WO 2016205199 A1 12/2016
WO WO 2020196537 A1 10/2020

OTHER PUBLICATIONS

Extended European Search Report, dated Jun. 17, 2024, for European Patent Application No. 21919487.5-1215. (12 pages).
(Continued)

*Primary Examiner* — Temica M Beamer
(74) *Attorney, Agent, or Firm* — Seed Intellectual Property Law Group LLP

(57) ABSTRACT

This terminal comprises: a reception circuit that receives a parameter relating to cell selection set on the basis of the function, type, and/or operation mode of the terminal; and a control circuit that performs a process for cell selection on the basis of the parameter.

8 Claims, 12 Drawing Sheets

(56) References Cited

U.S. PATENT DOCUMENTS

| | | | | |
|---|---|---|---|---|
| 2020/0322856 | A1* | 10/2020 | Wang | H04W 36/04 |
| 2021/0352542 | A1* | 11/2021 | Chang | H04W 48/18 |
| 2022/0191947 | A1 | 6/2022 | Nishio et al. | |
| 2022/0256634 | A1* | 8/2022 | Kim | H04W 76/15 |

OTHER PUBLICATIONS

Qualcomm Incorporated, "Impact of reduced capabilities on idle mode procedures," R2-2008890, Agenda Item: 8.12.2.1, 3GPP TSG-RAN WG2 Meeting #112-e, Online, Nov. 2-13, 2020. (3 pages).

3GPP TR 38.913 V16.0.0, "3rd Generation Partnership Project; Technical Specification Group Radio Access Network; Study on Scenarios and Requirements for Next Generation Access Technologies; (Release 16)," Jul. 2020. (40 pages).

3GPP TS 23.501 V16.1.0, "3rd Generation Partnership Project; Technical Specification Group Services and System Aspects; System Architecture for the 5G System; Stage 2 (Release 16)," Jun. 2019. (368 pages).

3GPP TS 36.304 V16.3.0, "3rd Generation Partnership Project; Technical Specification Group Radio Access Network; Evolved Universal Terrestrial Radio Access (E-UTRA); User Equipment (UE) procedures in idle mode (Release 16)," Dec. 2020. (64 pages).

3GPP TS 38.104 V15.12.0, "3rd Generation Partnership Project; Technical Specification Group Radio Access Network; NR; Base Station (BS) radio transmission and reception (Release 15)," Dec. 2020. (238 pages).

3GPP TS 38.211 V15.6.0, "3rd Generation Partnership Project; Technical Specification Group Radio Access Network; NR; Physical channels and modulation (Release 15)," Jun. 2019. (97 pages).

3GPP TS 38.213 V16.4.0, "3rd Generation Partnership Project; Technical Specification Group Radio Access Network; NR; Physical layer procedures for control (Release 16)," Dec. 2020. (181 pages).

3GPP TS 38.300 V15.6.0, "3rd Generation Partnership Project; Technical Specification Group Radio Access Network; NR; NR and NG-RAN Overall Description; Stage 2 (Release 15)," Jun. 2019. (99 pages).

3GPP TS 38.304 V16.3.0, "3rd Generation Partnership Project; Technical Specification Group Radio Access Network; NR; User Equipment (UE) procedures in Idles mode and RRC Inactive state (Release 16)," Dec. 2020. (39 pages).

China Telecom, "New WID on NR coverage enhancements," RP-202928, Agenda Item: 9.1.1, 3GPP TSG RAN meeting #90e, Electronic Meeting, Dec. 7-11, 2020. (5 pages).

Ericsson et al., "New WID on support of reduced capability NR devices," RP-202933, Agenda Item: 9.1.1, 3GPP TSG RAN Meeting #90e, Electronic Meeting, Dec. 7-11, 2020. (5 pages).

International Search Report, mailed Nov. 30, 2021, for International Patent Application No. PCT/JP2021/033366. (9 pages) (with English Translation).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

Qualcomm Inc et al., "Idle Mode cell reselection based on CN type supported," R2-2004862 Revision of R2-2002609, Agenda Item: 7.1.4, 3GPP TSG-RAN WG2 Meeting #110-e, E-meeting, Apr. 20-30, 2020. (10 pages).

Qualcomm Incorporated, "Miscellaneous corrections (Rapporteur)," R2-2008466, Change Request, 38.304, CR 0184, rev 1, Current Version 16.1.0, 3GPP TSG-RAN2#111-e, Electronic, Aug. 17-28, 2020. (6 pages).

Office Action, dated Jun. 30, 2026, for Indian Patent Application No. 202317046020. (7 pages)(with English Translation).

* cited by examiner

200

| | | 2-step RACH | |
|---|---|---|---|
| | | ○ | × |
| CovEnh | ○ | $Q_{rxlevmin\_CovEnh\_2SR}$ | $Q_{rxlevmin\_CovEnh}$ |
| | × | $Q_{rxlevmin\_2SR}$ or $Q_{rxlevmin}$ | $Q_{rxlevmin}$ |

FIG. 7

TERMINAL AND COMMUNICATION METHOD

TECHNICAL FIELD

The present disclosure relates to a terminal and a communication method.

BACKGROUND ART

In recent years, a dramatic growth of Internet of Things (IoT) has been expected with the expansion and diversification of radio services as a background. The usage of mobile communication is extending to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G) has characteristics such as enhanced mobile broadband (eMBB), massive machine type communication (mMTC), and ultra reliable and low latency communication (URLLC), and can flexibly provide radio communication in response to a wide variety of needs.

The 3rd Generation Partnership Project (3GPP) as an international standardizing body has been specifying New Radio (NR) as one of 5G radio interfaces.

CITATION LIST

Patent Literature

PTL 1
WO 2020/196537

Non-Patent Literature

NPL 1
3GPPTS38.104 V15.12.0, "NR Base Station (BS) radio transmission and reception (Release 15)," December 2020.

NPL 2
RP-202928, "New WID on NR coverage enhancements," China Telecom, December 2020.

NPL 3
RP-202933, "New WID on support of reduced capability NR devices," Ericsson, Nokia, December 2020.

NPL 4
3GPP TS38.304 V16.3.0, "User Equipment (UE) procedures in idle mode and RRC Inactive state (Release 16)," December 2020.

NPL 5
3GPP TS36.304 V16.3.0, "User Equipment (UE) procedures in idle mode (Release 16)," December 2020.

NPL 6
3GPP TS38.213 V16.4.0, "Physical layer procedures for control (Release 16)," December 2020.

SUMMARY OF INVENTION

Technical Problem

There is scope for further study, however, on a method of selecting a cell in radio communication.

One non-limiting and exemplary embodiment of the present disclosure facilitates providing a terminal and a communication method each capable of improving the cell-selection efficiency in radio communication.

A terminal according to an exemplary embodiment of the present disclosure includes: reception circuitry, which, in operation, receives a parameter relating to cell selection, the parameter being configured based on at least one of a function, a type, and/or an operation mode of the terminal; and control circuitry, which, in operation, performs processing for the cell selection based on the parameter.

It should be noted that general or specific embodiments may be implemented as a system, a method, an integrated circuit, a computer program, a storage medium, or any selective combination thereof.

According to an exemplary embodiment of the present disclosure, it is possible to improve the cell-selection efficiency in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 7 illustrates examples of parameters used for cell selection;

DESCRIPTION OF EMBODIMENTS

Figure 1:
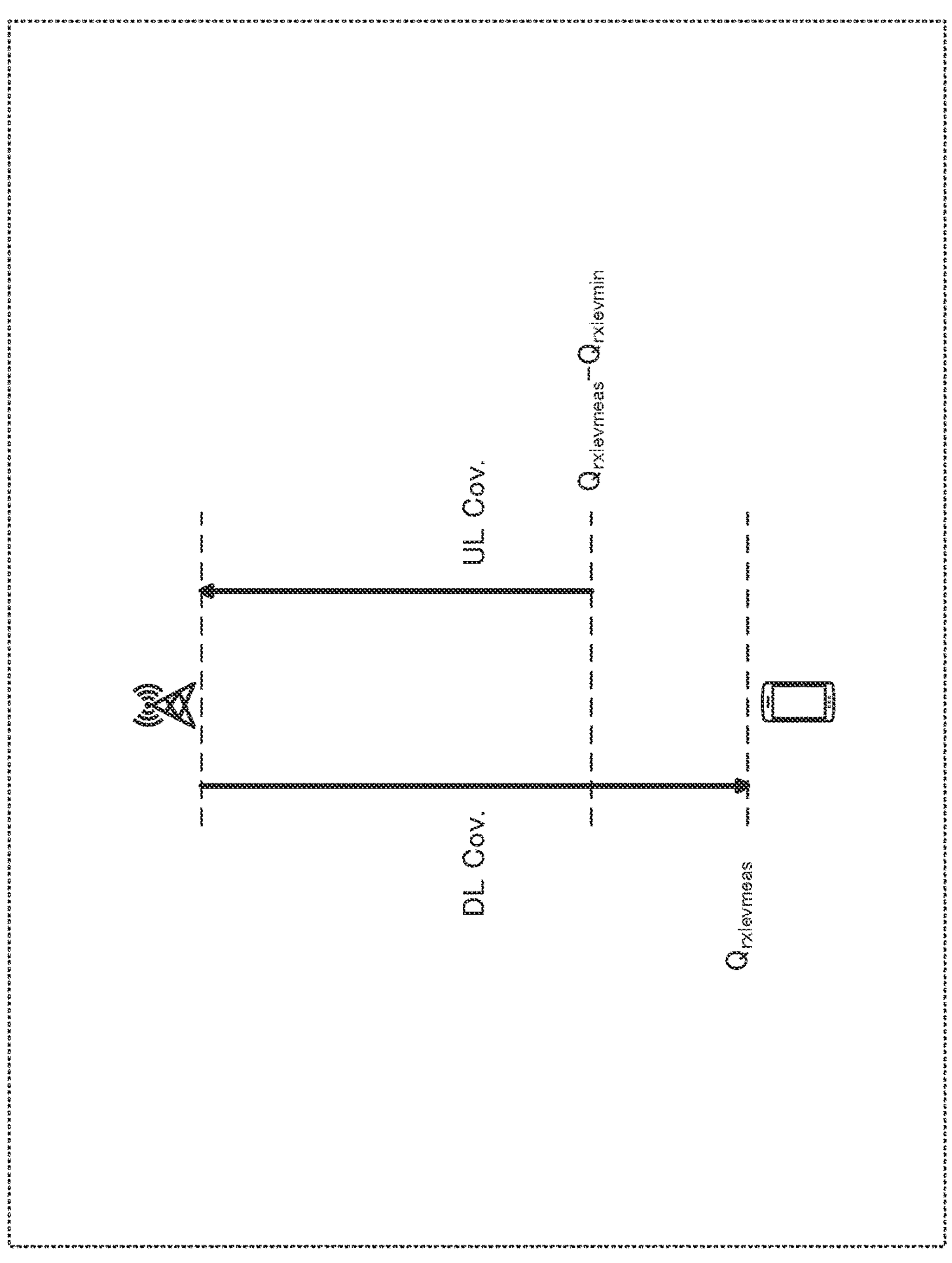
FIG. 1 illustrates an exemplary cell-selection method in a case where coverage is different between uplink and downlink.

Hereinafter, embodiments of the present disclosure will be described in detail with reference to the accompanying drawings.

In NR, for example, in addition to a frequency band of 6 GHz or less, mainly within 700-MHz to 3.5-GHz band (e.g., may be referred to as Frequency Range 1 (FR1)), which has been used for cellular communication, a millimeter-wave band such as 28-GHz or 39-GHz band capable of ensuring a wide band (e.g., may be referred to as FR2) can be utilized (e.g., see Non-Patent Literature (hereinafter referred to as "NPL") 1). Further, in FR1, for example, a frequency band is possibly used which is high compared with the frequency band, such as 3.5-GHz band that is used in Long Term Evolution (LTE) or 3rd Generation mobile communication systems (3G). The higher the frequency band is, the greater the radio wave propagation loss is, and thus, the received quality of radio waves is likely to be deteriorated. Hence, in NR, when the frequency band higher than that in LTE or 3G is used, for example, it is expected to ensure almost the same communication area (or coverage) as to a Radio Access Technology (RAT) such LTE or 3G, in other words, ensure the appropriate communication quality. By way of example, in Release 17 (also expressed as, e.g., "Rel. 17"), a method of improving coverage in NR has been studied (e.g., see NPL 2).

Further, in NR, for example, it has been discussed to enable development of a simple and low-cost terminal (e.g., also referred to as User Equipment (UE)) in which the number of antennae, maximum bandwidth, or power consumption is reduced, as compared with a terminal such as a smart phone (e.g., see NPL 3). Such a low-cost terminal may be referred to as, for example, a terminal corresponding to Reduced Capability (hereinafter may also be referred to as a "RedCap-terminal").

[Exemplary Operation for Cell Selection]

In NR, for example, processing of determining a cell to which a terminal is connected when the terminal is in an IDLE state or an INACTIVE state has been specified (e.g., see NPL 4). This processing (or operation) is referred to as, for example, "cell selection" or "cell reselection." Incidentally, the cell selection and the cell reselection may be collectively referred to as "cell selection." For example, the "cell selection" may include processing related to the "cell reselection." In the following, an exemplary operation for the cell selection in NR will be described.

For example, in the first cell selection (initial cell selection) of a terminal in the IDLE state, the terminal may search (i.e., scan) a plurality of (e.g., all of) channels (e.g., RF channels or frequencies) in a frequency band supporting NR (e.g., referred to as NR frequency band or NR band), in accordance with the capability of this terminal with respect to a radio frequency (RF).

For example, the terminal may search for a stronger cell (e.g., strongest cell) at each frequency. Here, the strength of a cell may be determined based on, for example, at least one of a received signal power (e.g., Reference Signal Received Power (RSRP)) and a received quality (e.g., Reference Signal Received Quality (RSRQ)).

Alternatively, for example, in a case where the terminal has information on measurement control information received in the past or information on a frequency or a cell parameter that is obtained from a cell detected in the past, the terminal may perform the cell selection based on these pieces of information (also referred to as Cell selection by leveraging stored information, for example). In this case, the terminal need not search all the RF channels in the NR frequency band.

In the cell selection described above, when a suitable cell is found, the terminal selects (in other words, Camps on) the cell. Here, the "suitable cell" may be, for example, a cell that satisfies a criterion or criteria (hereinafter referred to as "criteria") for the cell selection and that allows access of the terminal. Further, as the cell-selection criteria, for example, it is specified that the following Expression 1 is satisfied (see, e.g., NPL 4):

$$Srxlev > 0 \text{ AND } \mathrm{Squal} > 0. \quad \text{(Expression 1)}$$

Here, Srxlev is a received-power level (e.g., represented by [dB]) related to the cell selection, and Squal is a received-quality level (e.g., represented by [dB]) related to the cell selection, which may be given by the following Expressions 2 and 3, respectively.

$$Srxlev = Q_{rxlevmeas} - (Q_{rxlevmin} + Q_{rxlevminoffset}) - Pcompensation - Qoffset_{temp}; \text{ and} \quad \text{(Expression 2)}$$

$$\mathrm{Squal} = Q_{qualmeas} - (Q_{qualmin} + Q_{qualminoffset}) - Qoffset_{temp}. \quad \text{(Expression 3)}$$

In Expression 2, $Q_{rxlevmeas}$ is a received power (e.g., RSRP) measured by the terminal, $Q_{rxlevmin}$ is a minimum required received power (e.g., represented by [dBm]), $Q_{rxlevminoffset}$ is an offset value with respect to $Q_{rxlevmin}$, Pcompensation is a correction value related to uplink transmission power capability of the terminal (e.g., represented by [dB]), and $\mathrm{Qoffset}_{temp}$ is an offset value applied temporarily (e.g., represented by [dB]). Further, in Expression 3, $Q_{qualmeas}$ is a received quality (e.g., RSRQ) measured by the terminal, $Q_{qualmin}$ is a minimum required received quality (e.g., represented by [dB]), and $Q_{qualminoffset}$ is an offset value with respect to $Q_{qualmin}$.

For example, "$Q_{rxlevminoffset}$" and "$Q_{qualminoffset}$" in Expressions 2 and 3 may be applied to a measurement result of high-priority PLMN when the terminal selects Visitor Public Land Mobile Network (VPLMN).

Meanwhile, the terminal may perform processing for the cell-reselection after selecting (Camping on) a cell by the cell selection.

The minimum required received power (e.g., $Q_{rxlevmin}$), the minimum required received quality (e.g., $Q_{qualmin}$), the offset value (e.g., $Q_{rxlevminoffset}$ and $Q_{qualminoffset}$), and the correction value (Pcompensation), each of which is a parameter for the cell selection and the cell reselection, may be transmitted (i.e., signaled or configured) from a base station (e.g., also referred to as gNB) to the terminal by broadcast information (e.g., System Information Block (SIB)), for example. For example, the minimum required received power, $Q_{rxlevmin}$, and the minimum required received quality, $Q_{qualmin}$, may be respectively indicated to the terminal by parameters "q-RxLevMin" and "q-RxQualMin" that are transmitted by the SIB.

In the cell-selection criteria described above, for example, Srxlev and Squal respectively determine coverage of cells to be measured by the RSRP and the RSRQ. For example, as illustrated in FIG. 1, when the coverage in uplink is narrower than the coverage in downlink, appropriate configuration of the value of $Q_{rxlevmin}$ or $Q_{qualmin}$ allows the terminal to select a cell that satisfies the coverage in uplink within a connectable range. For example, as illustrated in FIG. 1, $Q_{rxlevmin}$ may be configured based on a difference between the coverage in downlink and the coverage in uplink.

Incidentally, although FIG. 1 illustrates an example for $Q_{rxlevmin}$, the same applies to $Q_{qualmin}$. Further, "$Q_{rxlevmin}$" will be described below as an exemplary parameter for the cell-selection criteria, but the parameter for the cell-selection criteria is not limited to $Q_{rxlevmin}$ and may be other parameters such as $Q_{qualmin}$ or the offset value.

Meanwhile, in Rel. 17, for example, coverage improvement in NR has been discussed. By way of example, a coverage extension (coverage enhancement (CE)) in uplink has been studied, such as an uplink shared channel (Physical Uplink Shared Channel ((PUSCH)), an uplink control channel (Physical Uplink Control Channel (PUCCH)), or Msg.3 PUSCH (or Msg. A) in a random access procedure.

Figure 2:
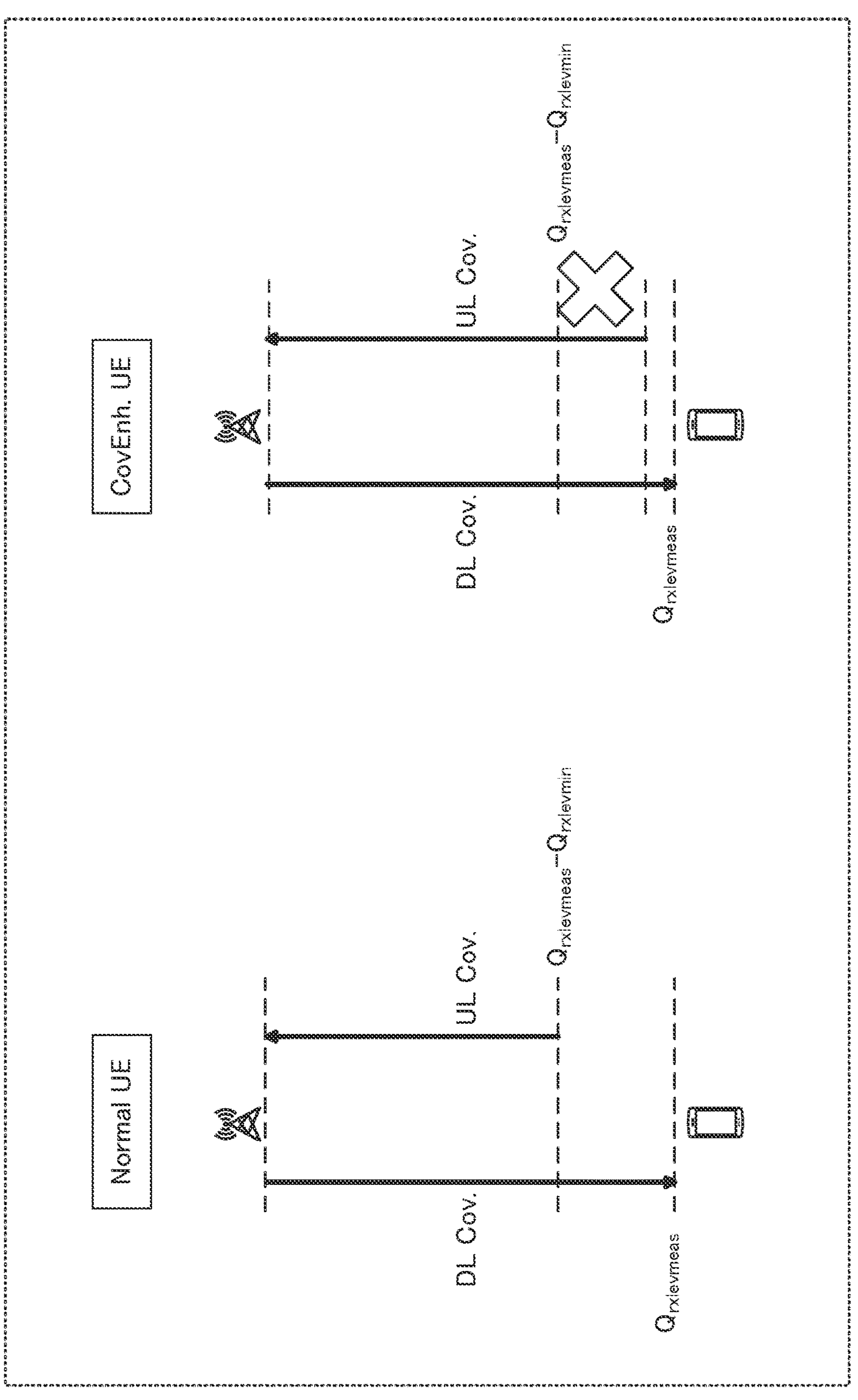
FIG. 2 illustrates an exemplary cell-selection method.

By way of example, as illustrated in FIG. 2, a terminal having a coverage-enhancement function (e.g., CovEnh. UE) can extend (enhance) the coverage in uplink, as compared with an existing terminal (i.e., terminal not having coverage-enhancement function). In this case, for example, when cell-selection criteria based on existing broadcast information ($Q_{rxlevmin}$ in example of FIG. 2) are used, the terminal having the coverage-enhancement function may not be connected to a cell for the reason that the cell-selection criteria are not satisfied within a range where the coverage in uplink is extended, even though the coverage in uplink within a connectable range has been extended. In other words, the terminal having the coverage-enhancement function illustrated in FIG. 2 may not be connected to a suitable cell under the cell-selection criteria using $Q_{rxlevmin}$ indicated by the broadcast information similar to that for the existing terminal.

Further, in NR, as mentioned above, introduction of a low-cost terminal in which the number of antennae, maximum bandwidth, or power consumption is reduced, as compared with a general terminal such as a smart phone, has been studied. Such a low-cost terminal has reduced functionality as compared with other terminals, so that the low-cost terminal may be different in coverage from the other terminals. Hence, for example, when the cell-selection criteria based on information similar to the broadcast information for the other terminals is used, the low-cost terminal may not be connected to a suitable cell.

Further, in NR, for example, when a terminal supports a Supplementary Uplink (SUL) frequency, a parameter "q-RxLevMinSUL" for the SUL frequency, which is indicated separately from "q-RxLevMin" that is a parameter for the existing cell-selection criteria, may be configured as the parameter, $Q_{rxlevmin}$, for calculation of cell-selection criteria.

Meanwhile, in LTE, for example, a cell-selection operation for the coverage enhancement with respect to a terminal supporting MTC (hereinafter referred to as an "MTC-terminal") is specified (e.g., see NPL 5). For example, in a case where the terminal does not satisfy the cell-selection criteria in normal coverage, the terminal may configure a parameter "$Q_{rxlevmin\_CE}$" for the coverage enhancement, which is indicated separately from a parameter for this cell-selection criteria, as $Q_{rxlevmin}$ for calculation of cell-selection criteria. When the terminal satisfies the cell-selection criteria on the basis of the parameter for the coverage-enhancement, $Q_{rxlevmin\_CE}$, the terminal may determine to operate in a coverage-enhancement mode, for example.

Further, in a case where the terminal does not satisfy the cell-selection criteria in the normal coverage and the cell-selection criteria on the basis of the parameter for the coverage-enhancement, $Q_{rxlevmin\_CE}$, the terminal may configure, as $Q_{rxlevmin}$ for calculation of cell-selection criteria, a parameter "$Q_{rxlevmin\_CE1}$" for the coverage-enhancement mode (e.g., referred to as Coverage-enhancement mode B), which is indicated separately from the parameter for the cell-selection criteria in the normal coverage and the parameter for the coverage enhancement, $Q_{rxlevmin\_CE}$. When the terminal satisfies the cell-selection criteria on the basis of the parameter for the coverage-enhancement, $Q_{rxlevmin\_CE1}$, the terminal may determine to operate in Coverage-enhancement mode B, for example.

When a same method as for the above-described coverage enhancement in LTE is applied to the coverage enhancement in NR, for example, a parameter for the coverage enhancement (e.g., referred to as "q-RxLevCovEnh"), which is indicated separately from the parameter for the existing cell-selection criteria, q-RxLevMin, can be configured as $Q_{rxlevmin}$ for calculation of cell-selection criteria. However, it cannot be said that simply adding the parameter for the coverage enhancement is not enough to support the functions in NR such as the SUL frequency, a synchronization signal using multiple beams, or two-stage random access (e.g., 2-step Random Access Channel (RACH)). Further, in NR, various types of terminals such as a low-cost terminal may be introduced, not limited to a terminal supporting the coverage-enhancement function; thus, there is scope for study on cell-selection criteria for these terminals and for a terminal having the above-mentioned functions in NR.

Therefore, in a non-limiting and exemplary embodiment of the present disclosure, a method of improving the cell-selection efficiency in radio communication will be described, for example.

[Overview of Communication System]

A communication system according to each embodiment of the present disclosure includes base station 100 and terminal 200.

Figure 3:
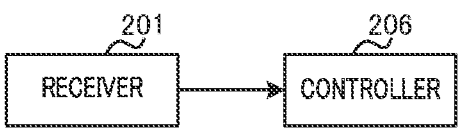
FIG. 3 is a block diagram illustrating an exemplary configuration of part of a terminal.

FIG. 3 is a block diagram illustrating an exemplary configuration of part of terminal 200 according to an exemplary embodiment of the present disclosure. In terminal 200 illustrated in FIG. 3, receiver 201 (e.g., corresponding to reception circuitry) receives a parameter relating to cell selection, which is configured based on at least one of a function, a type, and an operation mode of terminal 200. Controller 206 (e.g., corresponding to control circuitry) performs cell-selection processing based on the parameter.

Embodiment 1

[Configuration of Base Station]

Figure 4:
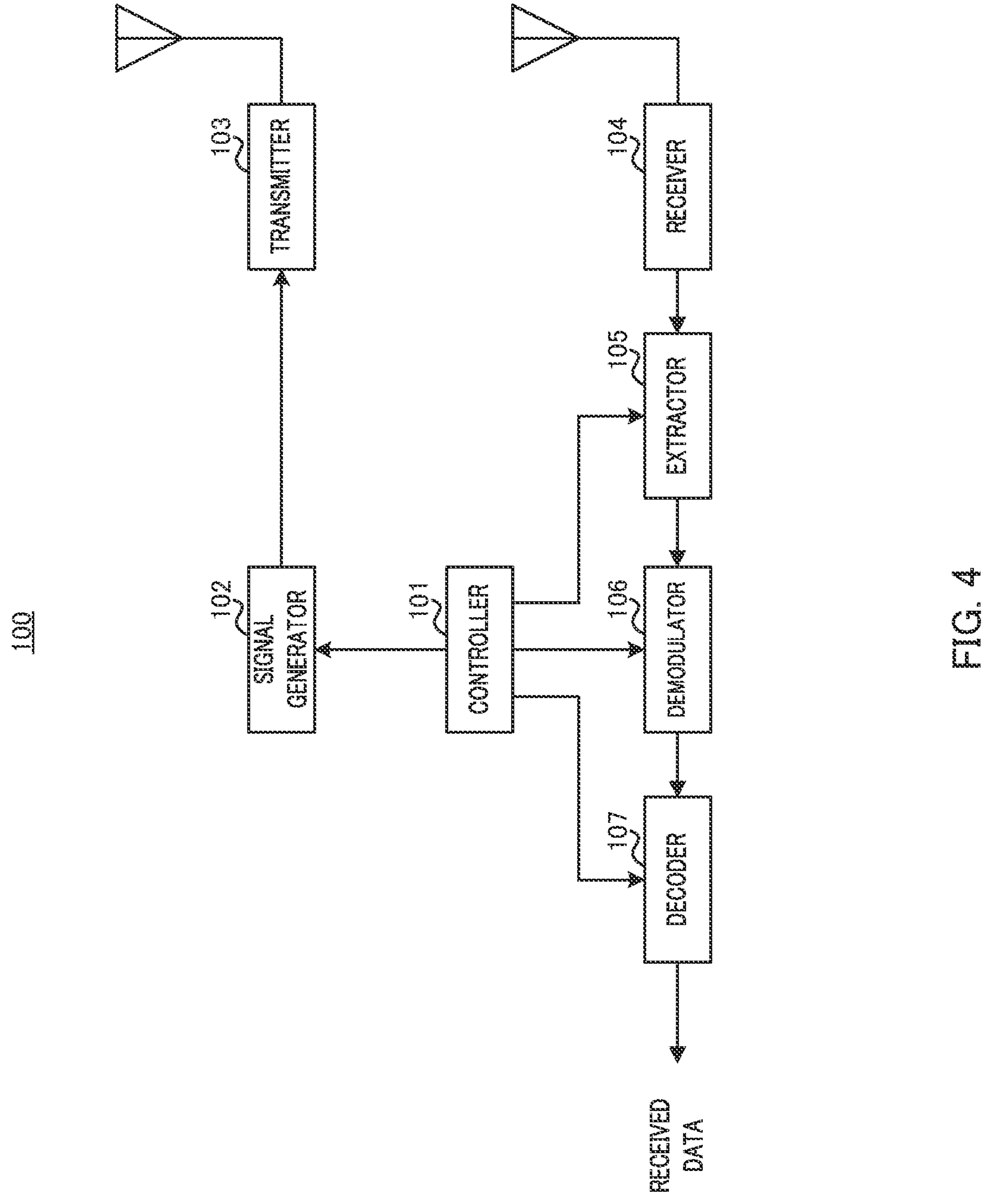
FIG. 4 is a block diagram illustrating an exemplary configuration of a base station.

FIG. 4 is a block diagram illustrating an exemplary configuration of base station 100 according to Embodiment 1. In FIG. 4, base station 100 includes controller 101, signal generator 102, transmitter 103, receiver 104, extractor 105, demodulator 106, and decoder 107.

Controller 101, for example, determines information on reception of a signal addressed to terminal 200 and outputs the determined information to signal generator 102. The signal addressed to terminal 200 may include, for example, an SSB used for initial access (a synchronization signal (SS)/physical broadcast channel (PBCH) Block) and system-information (e.g., System Information Block). Further, for example, information on reception of the SS/PBCH block, the SIB, or a Master Information Block (MIB) may include, for example, information on a radio resource for transmission of the SS/PBCH block, the SIB, or the MIB.

Controller 101 also determines, for example, determines a parameter for terminal 200 to calculate cell-selection criteria, and outputs the determined information to signal generator 102. The parameter for calculating the cell-selection criteria may include, for example, a parameter for calculating at least one of Srxlev and Squal for the cell-selection criteria (e.g., at least one of $Q_{rxlevmin}$, $Q_{qualmin}$, $Q_{rxlevminoffset}$, $Q_{qualminoffset}$, and Pcompensation).

Further, controller 101 determines, for example, information for terminal 200 on an operation method for the initial access and outputs the determined information to signal generator 102. The information on the operation method for the initial access may include information such as a radio resource for an uplink signal (e.g., PRACH or Msg.3 (Msg.A)) in the initial access and the number of Repetitions. Meanwhile, controller 101 may output the determined information to at least one of extractor 105, demodulator 106, and decoder 107. Incidentally, a determination method for the initial-access operation in controller 101 will be described later.

Signal generator 102, for example, generates a signal addressed to terminal 200 (e.g., at least one of data signal, SS/PBCH block, SIB bit string, or MIB bit string), based on the information input from controller 101. For example, the SIB bit string may include information (or parameter) on the cell-selection criteria, which is input from controller 101. In addition, signal generator 102 may perform encoding on the generated signal bit string, for example.

Signal generator 102, for example, modulates the generated signal (or encoded bit string). In addition, signal generator 102, for example, maps the modulated signals (e.g., symbol string) to a radio resource, based on the information indicating the radio resource input from controller 101. Signal generator 102 outputs, to transmitter 103, the signals mapped to the radio resource.

Transmitter 103, for example, may perform transmission-waveform generation processing such as orthogonal Frequency Division Multiplexing (OFDM) on the signal input from signal generator 102. In addition, for example, in the case of an OFDM transmission in which a cyclic prefix (CP) is added, transmitter 103 may perform Inverse Fast Fourier Transform (IFFT) processing on the signal, and adds the CP to the signal resulting from the IFFT. Moreover, transmitter 103 performs RF processing such as D/A conversion or up-conversion on the signal and transmits the resulting radio signal to terminal 200 via an antenna.

Receiver 104, for example, performs RF processing such as down-conversion or A/D conversion on the uplink signal received from terminal 200 via the antenna. Further, in the case of the OFDM transmission, receiver 104 performs Fast Fourier Transform (FFT) processing on the received signal and outputs the resulting frequency-domain signal to extractor 105.

Extractor 105, for example, extracts, based on the information input from controller 101, a radio resource part with which the uplink signal (e.g., PRACH, or Msg.3 (or Msg.A)) to be transmitted by terminal 200 has been transmitted and then outputs the extracted radio resource part to demodulator 106.

Demodulator 106, for example, demodulates the received signal input from extractor 105, based on the information input from controller 101, and then outputs the demodulation result to decoder 107.

Decoder 107, for example, performs detection of PRACH or error correction decoding on the uplink signal (e.g., PRACH, or Msg.3 (or Msg.A)), based on the information input from controller 101 and the demodulation result input from demodulator 106, and thereby obtains the detection result or the reception bit sequence after the decoding.

[Configuration of Terminal]

Figure 5:
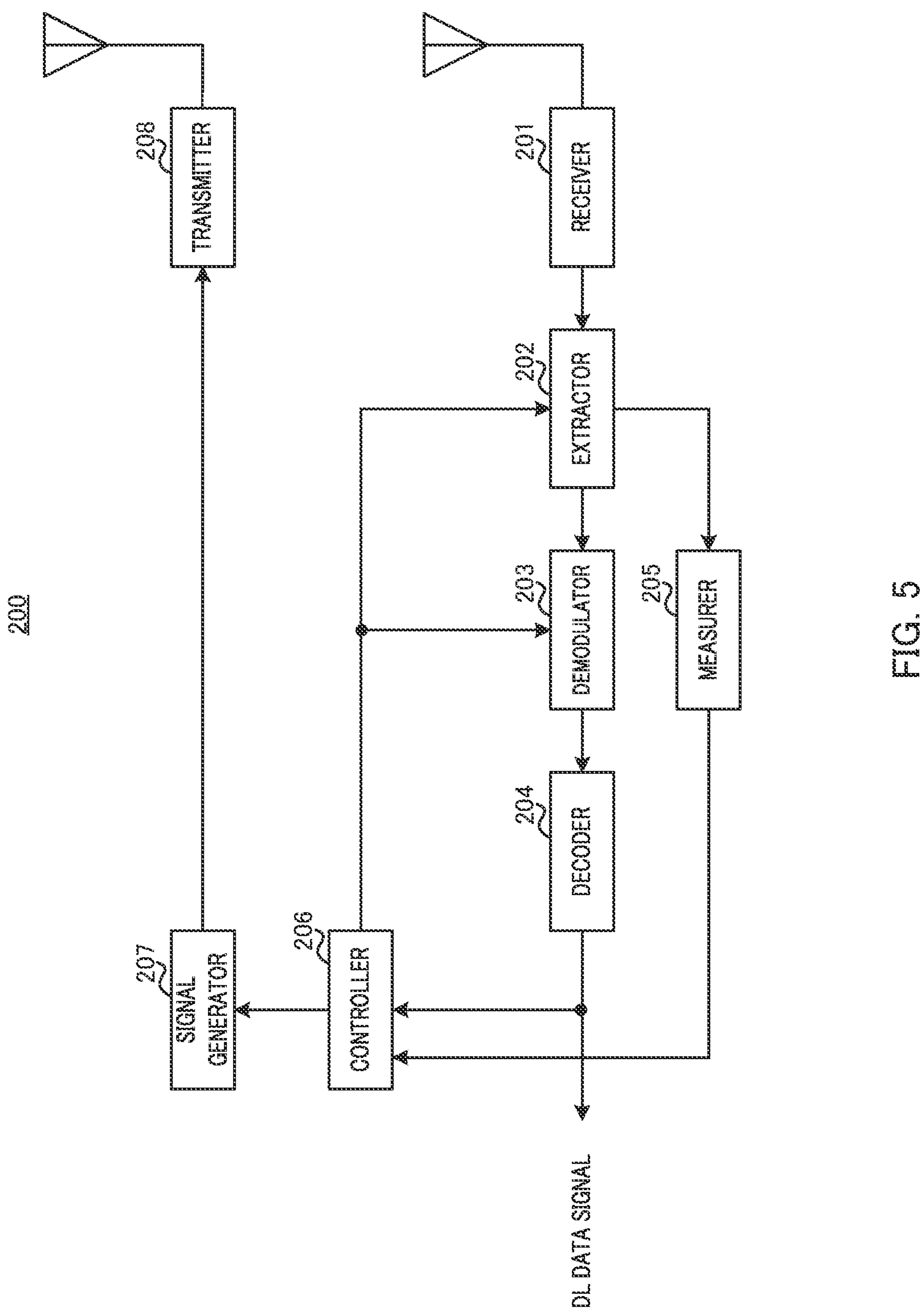
FIG. 5 is a block diagram illustrating an exemplary configuration of the terminal.

FIG. 5 is a block diagram illustrating an exemplary configuration of terminal 200 according to an exemplary embodiment of the present disclosure. For example, in FIG. 5, terminal 200 includes receiver 201, extractor 202, demodulator 203, decoder 204, measurer 205, controller 206, signal generator 207, and transmitter 208.

Receiver 201, for example, receives a downlink signal (e.g., data signal or control information) from base station 100 via an antenna, performs the RF processing such as the down-conversion or the A/D conversion on the received radio signal and obtains a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts, from the received signal input from receiver 201, a radio resource part, which may include the downlink signal (e.g., SS/PBCH block, SIB, or MIB), based on information on a radio resource for the downlink signal input from controller 206, and then outputs the radio resource part to demodulator 203 and measurer 205.

Demodulator 203, for example, based on the information input from controller 206, demodulates the received signal input from extractor 202 and outputs the demodulation result to decoder 204.

Decoder 204, for example, performs error correction decoding on the downlink signal (e.g., PBCH, SIB, or MIB), using the demodulation result input from demodulator 203, and obtains control information included in the PBCH, the SIB, or the MIB. Decoder 204 outputs the obtained control information to controller 206. Further, decoder 204 may output downlink received data obtained by the decoding.

Measurer 205 may, for example, measure at least one of a received power (e.g., RSRP) and a received quality (e.g., RSRQ), based on the received signal input from extractor 202. For example, measurer 205 outputs the obtained measurement result (e.g., RSRP and RSRQ) to controller 206.

Controller 206 may, for example, control the cell selection based on the signal (e.g., MIB or SIB) input from decoder 204. For example, controller 206 may control the operation for the cell selection or the cell reselection, based on the parameter for calculating the cell-selection criteria obtained from the MIB or the SIB and the measurement result (e.g., RSRP and RSRQ) input from measurer 205. An exemplary operation for the cell selection or the cell reselection in controller 206 will be described later.

Further, when the criteria for the cell selection or the cell reselection are satisfied, for example, controller 206 determines an initial-access operation (e.g., random access operation. RACH resource configuration, or transmission power control) and outputs the determined information to signal generator 207.

Controller 206 may also determine, for example, information on reception of a downlink signal or transmission of an uplink signal (e.g., radio resource or encoding modulation information) based on the signal input from decoder 204. Controller 206 outputs the determined information to, for example, extractor 202, demodulator 203, and signal generator 207.

Signal generator 207, for example, generates an uplink signal (e.g., PRACH signal, Msg.A, or Msg.3) based on the information input from controller 206. In addition, signal generator 207 may perform encoding or modulation processing on the generated uplink signal. Signal generator 207, for example, maps the generated signals to a radio resource and outputs, to transmitter 208, the uplink signals mapped to the radio resource.

Transmitter 208, for example, performs transmission signal-waveform generation such as OFDM on the signal input from signal generator 207. Additionally, in the case of the OFDM transmission using the CP, for example, transmitter 208 performs the IFFT processing on the signal and adds the CP to the signal after the IFFT. Alternatively, when transmitter 208 generates a single-carrier waveform, Discrete Fourier Transform (DFT) processing may be performed after the modulation processing or before the mapping processing (not illustrated), for example. Moreover, transmitter 208, for example, performs the RF processing such as the D/A conversion or the up-conversion on a transmission signal and transmits the resulting radio signal to base station 100 via the antenna.

[Exemplary Operations of Base Station 100 and Terminal 200]

Exemplary operations of base station 100 and terminal 200 having the above configurations will be described.

In the present embodiment, in the cell selection by terminal 200, a parameter for the cell-selection criteria may be configured based on at least one of a "function" of terminal 200, a "type" of terminal 200, and an "operation mode" of terminal 200.

Examples of the functions (e.g., capabilities) of terminal 200 include a function corresponding to Rel. 15, a function corresponding to Rel. 16, a function corresponding to Rel. 17, a coverage-enhancement function, and a random access method (e.g., four-step or two-step random access). The functions may be specified by the UE Capability. Terminal 200 may have, for example, at least one of these functions. Note that the functions of terminal 200 are not limited to these examples, and the terminal may have another function.

An exemplary type of terminal 200 may be a type classified based on at least one of the number of antennae, the supportable bandwidth, and the power consumption. Examples of the types of terminal 200 include a RedCap-terminal, an MTC-terminal, and an existing (or general) terminal. Note that the types of terminal 200 are not limited to these examples, and another type may be specified. Further, for example, the types of terminal 200 may be specified by the UE Capability.

The operation mode of terminal 200 may be based on, for example, configuration to be determined in accordance with a condition of terminal 200 (e.g., measurement condition). For example, the operation mode may be specified (or defined) by a combination of a type of terminal 200, a function (e.g., coverage enhancement or random access method) configured for an actual operation of terminal 200, and a parameter (e.g., the number of Repetitions). Also, the operation mode may be specified depending on whether a frequency for the selected cell is FR1 or FR2.

By way of example, a parameter for cell-selection criteria may be different between a terminal having (or supporting) the coverage-enhancement function and an existing terminal (e.g., terminal not having (or not supporting) coverage function).

For example, a first parameter that can be used for the cell-selection criteria by an existing terminal and a plurality of (e.g., all of) terminals 200 for NR may be indicated by "q-RxLevMin" from base station 100 to terminal 200, and a second parameter that can be used for the cell-selection criteria by some of terminals 200 (e.g., terminal 200 having coverage-enhancement function) may be indicated by "q-RxLevMin2" from base station 100 to terminal 200.

In the following, a description will be given of an exemplary operation for the cell selection according to the present embodiment.

For example, in an initial cell selection of terminal 200 in the IDLE state, terminal 200 may search (scan) a plurality of (e.g., all of) RF channels (or frequencies) in an NR band, in accordance with the RF capability of this terminal 200. For example, terminal 200 may search for a stronger cell (e.g., strongest cell) at each RF channel (frequency).

Alternatively, for example, in a case where terminal 200 has information on measurement control information received in the past or information on a frequency or a cell parameter that is obtained from a cell detected in the past, terminal 200 may perform the cell selection based on these pieces of information (Cell selection by leveraging stored information). In this case, terminal 200 need not search the plurality of NR frequency bands.

When a suitable cell (e.g., cell that satisfies cell-selection criteria and allows access of terminal 200) is found, terminal 200 selects (Camps on) this cell.

As the cell-selection criteria, for example, it is specified that the following Expression 4 is satisfied:

$$Srxlev > 0 \text{ AND Squal} > 0. \quad \text{(Expression 4)}$$

Here, Srxlev is a received-power level (e.g., represented by [dB]) related to the cell selection, and Squal is a received-quality level (e.g., represented by [dB]) related to the cell selection, which may be given by the following Expressions 5 and 6, respectively.

$$Srxlev = Qr_{xlevmeas} - (Q_{rxlevmin} + Q_{rxlevminoffset}) - Pcompensation - Qoffset_{temp}; \text{ and} \quad \text{(Expression 5)}$$

$$\text{Squal} = Q_{qualmeas} - (Q_{qualmin} + Q_{qualminoffset}) - Qoffset_{temp}. \quad \text{(Expression 6)}$$

In Expression 5, $Q_{rxlevmeas}$ is a received power (e.g., RSRP) measured by terminal 200, $Q_{rxlevmin}$ is a minimum required received power (e.g., represented by [dBm]), $Q_{rxlevminoffset}$ is an offset value with respect to $Q_{rxlevmin}$, Pcompensation is a correction value related to uplink transmission power capability of terminal 200 (e.g., represented by [dB]), and $Qoffset_{temp}$ is an offset value applied temporarily (e.g., represented by [dB]). Further, in Expression 6, $Q_{qualmeas}$ is a received quality (e.g., RSRQ) measured by terminal 200, $Q_{qualmin}$ is a minimum required received quality (e.g., represented by [dB]), and $Q_{qualminoffset}$ is an offset value with respect to $Q_{qualmin}$.

For example, "$Q_{rxlevminoffset}$" and "$Q_{gualminoffset}$" in Expressions 5 and 6 may be applied to a measurement result of high-priority PLMN when terminal 200 selects VPLMN.

Meanwhile, terminal 200 may perform processing for the cell-reselection after selecting (Camping on) a cell by the cell selection.

The minimum required received power (e.g., $Q_{rxlevmin}$), the minimum required received quality (e.g., $Q_{qualmin}$), the offset value (e.g., $Q_{rxlevminoffset}$ and $Q_{qualminoffset}$), and the correction value (Pcompensation), each of which is a parameter for the cell selection and the cell reselection, may be transmitted (i.e., signaled or configured) from base station 100 to terminal 200 by broadcast information (e.g., SIB), for example.

For example, the minimum required received power, $Q_{rxlevmin}$, and the minimum required received quality, $Q_{qualmin}$, may be respectively indicated to terminal 200 by first parameters "q-RxLevMin" and "q-RxQualMin" that are transmitted by the SIB.

Further, for example, when terminal 200 supports the SUL frequency, terminal 200 may configure a parameter "q-RxLevMinSUL" for the SUL frequency, which is indicated to terminal 200 separately from q-RxLevMin that is the first parameter, as $Q_{rxlevmin}$ for calculation of the cell-selection criteria (e.g., Expression 5).

Further, for example, in a case where terminal 200 does not satisfy the cell-selection criteria using q-RxLevMin or q-RxLevMinSUL described above, terminal 200 may configure a second parameter "q-RxLevMin2," which is indicated separately from the first parameter, q-RxLevMin, and the parameter for the SUL frequency, q-RxLevMinSUL, as $Q_{rxlevmin}$ for calculation of cell-selection criteria (e.g., Expression 5). When terminal 200 satisfies the cell-selection criteria using the second parameter, for example, terminal 200 may determine to operate in an operation mode (e.g., coverage-enhancement mode) corresponding to the second parameter.

The second parameter is not limited to the parameter corresponding to the minimum required received power, $Q_{rxlevmin}$, in Expression 5 described above, and may be configured, with respect to the calculation of the cell-selection criteria, Srxlev, in Expression 5, for example, as an offset-value, $Q_{offset2}$, expressed by the following Expression 7:

$$S_{rxlev} = Q_{rxlevmeas} - (Q_{rxlevmin} + Q_{offset2} + Q_{rxlevminoffset}) - Pcompensation - Qoffset_{temp}. \quad \text{(Expression 7)}$$

Further, for example, when terminal 200 is capable of configuring the second parameter (e.g., terminal has coverage-enhancement function), terminal 200 may perform cell selection on the basis of the cell-selection criteria using the second parameter, without applying the cell-selection criteria using the first parameter.

Further, an example has been given in which the second parameter is introduced to the cell-selection criteria on the basis of RSRP (e.g., Srxlev), but the present disclosure is not limited to this. For example, in the present embodiment, the second parameter may be introduced to the cell-selection criteria on the basis of RSRP (e.g., Srxlev) as well as to the cell-selection criteria on the basis of RSRQ (e.g., Squal). Also, for example, the second parameter may be introduced to either or both of the cell-selection criteria on the basis of RSRP (e.g., Srxlev) and the cell-selection criteria on the basis of RSRQ (e.g., Squal).

Further, the second parameter may be a parameter for a received power such as the minimum required received power, $Q_{rxlevmin}$, or a parameter for a received quality such as the minimum required received quality, $Q_{qualmin}$. The second and third parameters may be, for example, other parameters such as offset values, $Q_{rxlevminoffset}$, $Q_{qualminoffset}$, and $Qoffset_{temp}$, or a correction value, Pcompensation, which are used for determination of the cell-selection criteria.

The above-mentioned second parameter, q-RxLevMin2, is exemplary. For example, "q-RxLevMinCovEnh" may be indicated to terminal 200 having the coverage-enhancement function, and "q-RxLevMinRedCap" may be indicated to a RedCap-terminal, that is, the second parameter may be configured for each function of terminal 200 or type of terminal 200.

Further, there may be plural levels of the cell-selection criteria (i.e., parameter candidates for cell-selection criteria) that can be used by some of terminals 200. In one example, when terminal 200 does not satisfy the cell-selection criteria calculated by the above-mentioned q-RxLevMin or q-RxLevMinSUL, terminal 200 may configure the second parameter, q-RxLevMin2, which is indicated separately from q-RxLevMin and q-RxLevMinSUL, as $Q_{rxlevmin}$ (e.g., $Q_{rxlevmin2}$) for calculation of cell-selection criteria. When terminal 200 satisfies the cell-selection criteria on the basis of the second parameter, for example, terminal 200 may determine to operate in an operation mode corresponding to the second parameter (e.g., coverage-enhancement mode with a relatively small number of Repetitions).

Furthermore, when terminal 200 does not satisfy the cell-selection criteria calculated by the second parameter, q-RxLevMin2, terminal 200 may configure a third parameter, q-RxLevMin3, which is indicated separately from the first and second parameters, as $Q_{rxlevmin}$ (e.g., $Q_{rxlevmin3}$) for calculation of cell-selection criteria. When terminal 200 satisfies the cell-selection criteria on the basis of the third parameter, for example, terminal 200 may determine to operate in an operation mode corresponding to the third parameter (e.g., coverage-enhancement mode with a relatively large number of Repetitions).

Note that the number of levels of cell-selection criteria is not limited to three and may be four or more.

When a suitable cell is found, terminal 200 may select (Camp on) this cell and start an initial-access operation (e.g., random access operation), for example.

The exemplary operation for the cell selection in terminal 200 has been described, thus far.

Next, an exemplary operation after terminal 200 selects (Camps on) a cell will be described.

Terminal 200 may, for example, control the initial-access operation based on a determination result of the cell selection (e.g., whether cell-selection criteria are satisfied). For example, terminal 200 may control the RACH resource configuration or the random access operation in accordance with a parameter (e.g., first parameter or second parameter) applied when the above-mentioned cell-selection criteria are satisfied.

<Example of RACH Resource Configuration>

Terminal 200 may, for example, determine a RACH resource to be applied in the initial access, based on the parameter applied when the cell-selection criteria are satisfied. For example, the RACH resource or a RACH preamble may be different for each parameter that is applied to the cell-selection criteria.

By way of example, a RACH resource or a RACH preamble configured when the cell-selection criteria calculated by the first parameter are satisfied and a RACH resource or a RACH preamble configured when the cell-selection criteria calculated by the second parameter are satisfied may be configured, respectively.

For example, in a case where the cell-selection criteria calculated by the first parameter correspond to existing coverage, a RACH resource using an existing PRACH sequence may be configured. Further, for example, in a case where the cell-selection criteria calculated by the second parameter correspond to the coverage enhancement, a RACH resource using a plurality of PRACH sequences may be configured.

Meanwhile, the RACH resource may be configured based on, for example, a difference (gap) between the cell-selection criteria, Srxlev, calculated by the first parameter and the cell-selection criteria, Srxlev, calculated by the second (or second or later) parameter, not limited to being configured based on a value of the parameter applied to cell-selection criteria. For example, a RACH resource or a RACH preamble may be configured for each of the cases where a difference between the cell-selection criteria, Srxlev, respectively corresponding to the first parameter and the second parameter is equal to or less than a threshold (for example, X dB) and where the difference is greater than threshold X dB.

Further, the parameter configured in accordance with the parameter applied when the cell-selection criteria are satisfied is not limited to the RACH resource and may be (or in addition to RACH resource) the number of Repetitions at the time of Msg.3 transmission.

For example, Msg.3 Repetition may not be applied to terminal 200 satisfying the cell-selection criteria calculated by the first parameter, whereas Msg.3 Repetition may be applied to terminal 200 satisfying the cell-selection criteria calculated by the second parameter. Additionally, for example, the number of Repetitions at the time of Msg.3 transmission may be different between the case satisfying the cell-selection criteria calculated by the first parameter and the case satisfying the cell-selection criteria calculated by the second parameter. Further, for example, when there are plural levels of the cell-selection criteria that can be used by some of terminals 200, the number of Repetitions for Msg.3 Repetition may be varied in accordance with the respective levels.

The number of Repetitions for Msg.3 Repetition may be configured based on a difference between the cell-selection criteria, $S_{rxlev}$, calculated by the first parameter and the cell-selection criteria, $S_{rxlev}$, calculated by the second (or second or later) parameter.

<Example of RACH Operation>

Terminal 200 may, for example, determine a RACH operation to be applied, based on the parameter applied when the cell-selection criteria are satisfied. For example, the RACH operation may be different for each parameter applied to the cell-selection criteria.

For example, a random access method may be different based on the parameter applied to the cell-selection criteria.

For example, with respect to terminal 200 satisfying the cell-selection criteria calculated by the first parameter, both of a four-stage random access (e.g., also referred to as 4-step RACH, or Type-1 random access procedure) and a two-stage random access (e.g., 2-step RACH or Type-2 random access procedure) may be configured to be applicable. On the other hand, for example, with respect to terminal 200 satisfying the cell-selection criteria calculated by the second parameter, the 4-step RACH may be configured to be applicable. In other words, the 2-step RACH may be configured to be non-applicable with respect to terminal 200 satisfying the cell-selection criteria calculated by the second parameter.

In NR, for example, in a case where both of the 2-step RACH and the 4-step RACH are applicable, terminal 200 may select either of the 2-step RACH or the 4-step RACH based on "msgA-RSRP-Threshold." In the present embodiment, for example, a value of msgA-RSRP-Threshold may be determined in accordance with the parameter applied when the cell-selection criteria are satisfied.

Further, for example, the number of RACH Repetitions in the RACH operation may be varied based on the parameter applied to cell-selection criteria. For example, terminal 200 may not apply the RACH Repetition when the cell-selection criteria calculated by the first parameter are satisfied, and the terminal may apply the RACH Repetition when the cell-selection criteria calculated by the second parameter are satisfied. Additionally, for example, the number of RACH Repetitions may be different between the case satisfying the cell-selection criteria calculated by the first parameter and the case satisfying the cell-selection criteria calculated by the second parameter. Further, for example, when there are plural levels of the cell-selection criteria that can be used by some of terminals 200, the number of RACH Repetitions may be determined for each level.

Incidentally, when the RACH Repetition is applied, terminal 200 can suppress a decrease in utilization efficiency of a RACH resource, by applying the methods described in PTL 1.

<Example of Paging Resource Configuration>

Terminal 200 may, for example, determine a resource in which a paging signal is received (e.g., Paging occasion (PO)), based on the parameter applied when the cell-selection criteria are satisfied. For example, the PO may be different for each parameter that is applied to the cell-selection criteria.

For example, terminal 200 may apply an existing PO when the cell-selection criteria calculated by the first parameter are satisfied, and the terminal may apply Repetition for PO when the cell-selection criteria calculated by the second parameter are satisfied. Alternatively, for example, terminal 200 may vary the number of Repetitions for the PO for each parameter used for calculation of cell-selection criteria.

Meanwhile, the PO configuration (e.g., the presence of absence of Repetition or the number of Repetitions) may be based on, for example, a difference (gap) between the cell-selection criteria, Srxlev, calculated by the first parameter and the cell-selection criteria, Srxlev, calculated by the second (or second or later) parameter, not limited to being based on the parameter applied to cell-selection criteria.

The exemplary operation after terminal 200 selects (Camps on) a cell has been described, thus far.

The above-described configuration examples or operation examples may be combined. By way of example, terminal 200 may control, in accordance with the parameter satisfying cell-selection criteria, at least one of the RACH resource, the paging resource (PO), the number of Repetitions for a signal (e.g., at least one of Msg.3, RACH, and paging signal), or the RACH operation, which have been mentioned above.

Further, with respect to cell-reselection criteria, a parameter for cell-reselection criteria used for the cell reselection may be configured for each function of a terminal, each type of a terminal, or each operation mode of a terminal, as in the cell-selection criteria mentioned above.

Figure 6:
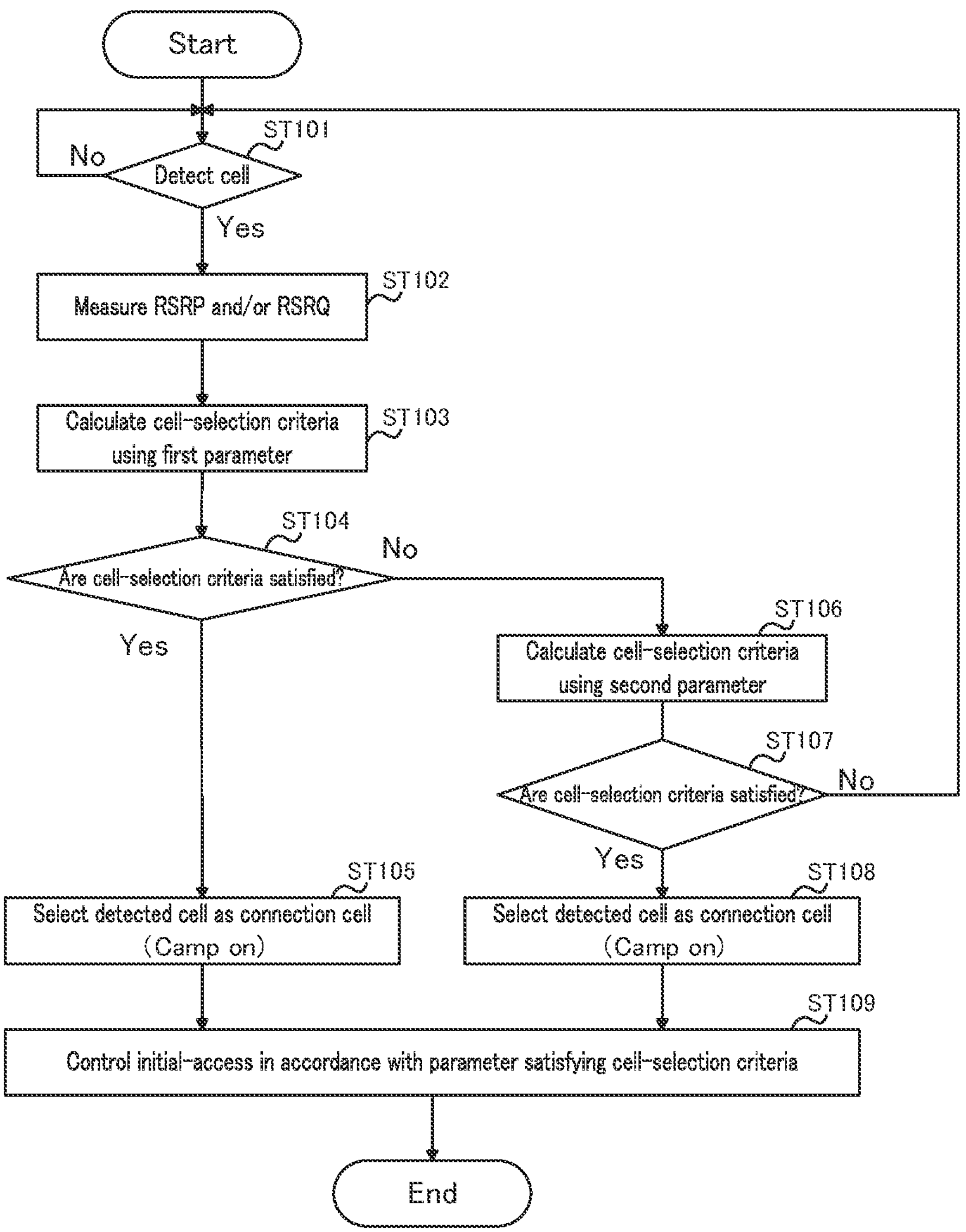
FIG. 6 is a flowchart illustrating an exemplary operation in the terminal.

FIG. 6 is a flowchart illustrating an exemplary operation related to the cell selection (e.g., cell selection operation and operation after cell selection) in terminal 200 according to the present embodiment.

In FIG. 6, terminal 200 determines whether a certain cell has been detected, for example (ST101). Terminal 200 may repeat the processing of ST101 when the cell is not detected, for example (ST101: No).

On the other hand, when the cell is detected (ST101: Yes), terminal 200 measures at least one of a received-power level (e.g., RSRP) and a received-quality level (e.g., RSRQ), for example (ST102).

Terminal 200 calculates cell-selection criteria using the first parameter (e.g., at least one of Srxlev and Squal), for example (ST103).

Terminal 200 determines whether the cell-selection criteria using the first parameter are satisfied (ST104). By way of example, terminal 200 may determine whether Expression 4 is satisfied, based on the measurement result in ST102 (e.g., RSRP and RSRQ) and the cell-selection criteria calculated in ST103 (e.g., Srxlev and Squal).

In a case where the cell-selection criteria using the first parameter are satisfied (ST104: Yes), terminal 200 selects the detected cell as a connection cell (ST105).

On the other hand, in a case where the cell-selection criteria using the first parameter are not satisfied (ST104: No), terminal 200 calculates cell-selection criteria using the second parameter (e.g., at least one of Srxlev and Squal), for example (ST106).

Terminal 200 determines whether the cell-selection criteria using the second parameter are satisfied (ST107). By way of example, terminal 200 may determine whether Expression 4 is satisfied, based on the measurement result in ST102 (e.g., RSRP and RSRQ) and the cell-selection criteria calculated in ST106 (e.g., Srxlev and Squal).

In a case where the cell-selection criteria using the second parameter are satisfied (ST107: Yes), terminal 200 selects the detected cell as a connection cell (ST108). On the other hand, when the cell-selection criteria using the second parameter are not satisfied (ST107: No), terminal 200 may perform the processing of ST101.

When selecting the connection cell (e.g., after processing of ST105 or ST108), terminal 200 may control an initial-access operation in accordance with the parameter (e.g., either first parameter or second parameter) that is applied when the cell-selection criteria are satisfied (e.g., ST109). The initial-access operation may include, for example, at least one of the RACH resource configuration, the Repetition configuration, the RACH-operation configuration, or the PO configuration, as mentioned above.

Incidentally, in FIG. 6, a case has been described as an example, where the parameters for cell-selection criteria are two, the first parameter and the second parameter, but the number of parameters (e.g., the number of candidates) for cell-selection criteria is not limited to two and may be three or more. For example, in a situation where three or more parameters are configured, terminal 200 may calculate the cell-selection criteria using the third (or later) parameter when the cell-selection criteria using the second parameter are not satisfied (e.g., S107: No, in FIG. 6).

Further, in FIG. 6, a case has been described as an example, where the cell-selection criteria using the second parameter are applied when the cell-selection criteria using the first parameter are not satisfied, but the present disclosure is not limited to this case. For example, terminal 200 may apply the cell-selection criteria using the second parameter while not applying the cell-selection criteria using the first parameter.

Further, the order of operations in terminal 200 is not limited to the example illustrated in FIG. 6. For example, terminal 200 may apply the cell-selection criteria using the first parameter when the cell-selection criteria using the second parameter are not satisfied.

The exemplary operations of base station 100 and terminal 200 have been each described, thus far.

Thus, in the present embodiment, terminal 200 receives a parameter for the cell selection, which is configured based on at least one of a function, a type, and an operation mode of terminal 200, and then performs the cell-selection processing based on the received parameter. This processing allows terminal 200 to, for example, perform the cell selection by using the cell-selection criteria configured for each of at least one of the function, the type, and the operation mode of terminal 200.

Thus, according to the present embodiment, for example, terminal 200 in the IDLE state or the INACTIVE state can select a suitable cell by the cell selection or the cell reselection in accordance with a function, a type, or an operation mode of terminal 200.

In addition, for example, the random access operation or the RACH resource is determined in accordance with the parameter applied when terminal 200 satisfies cell-selection criteria. This allows base station 100 to, for example, recognize the function, the type, or the operation mode of terminal 200 by receiving a random access signal, and to perform scheduling appropriately for this terminal 200 in subsequent initial accesses (e.g., Msg.2, Msg.B, and Msg.3).

Further, according to the present embodiment, for example, with respect to cell-selection criteria, a parameter used for the cell-selection criteria is configured corresponding to various functions in NR such as the coverage enhancement, the two-stage random access, the four-stage random access, or supporting the SUL frequency, or various terminal-types such as a low-cost terminal (e.g., RedCap-terminal); hence, terminal 200 can appropriately perform the cell selection in accordance with a function, a type, or an operation mode of terminal 200.

According to the present embodiment, it is possible to improve the cell-selection efficiency in radio communication.

Embodiment 2

Configurations of base station 100 and terminal 200 according to the present embodiment may be the same as the configurations in Embodiment 1.

In the present embodiment, in the cell selection by terminal 200, a parameter for cell-selection criteria may be configured for each combination of at least two of a function or functions of terminal 200, a type or types of terminal 200, and/or an operation mode or operation modes of the terminal 200.

By way of example, a parameter for cell-selection criteria may be different between a terminal having the coverage-enhancement function and an existing terminal (e.g., terminal not having coverage function). For example, a parameter for cell-selection criteria may be individually configured for each of terminal 200 having function A (e.g., coverage-enhancement function) and function B (e.g., 2-step RACH function) (i.e., terminal 200 having combination of function A and function B) and a RedCap-terminal having function A (i.e., terminal 200 having combination of function A and Redcap).

For example, a first parameter that can be used for the cell-selection criteria by an existing terminal and a plurality of (e.g., all of) terminals 200 for NR may be indicated by "q-RxLevMin" from base station 100 to terminal 200, a second parameter that can be used for the cell-selection criteria by some of terminals 200 (e.g., terminal 200 having coverage-enhancement function) may be indicated by "q-RxLevMin2" from base station 100 to terminal 200, and a third parameter that can be used for the cell-selection criteria by some of terminals 200 (e.g., terminal 200 having coverage-enhancement function and 2-step RACH function) may be indicated by "q-RxLevMin3" from base station 100 to terminal 200.

In the following, a description will be given of an exemplary operation for the cell selection according to the present embodiment.

For example, in an initial cell selection of terminal 200 in the IDLE state, terminal 200 may search (scan) a plurality of (e.g., all of) RF channels (or frequencies) in an NR band, in accordance with the RF capability of this terminal 200. For example, terminal 200 may search for a stronger cell (e.g., strongest cell) at each RF channel (frequency).

Alternatively, for example, in a case where terminal 200 has information on measurement control information received in the past or information on a frequency or a cell parameter that is obtained from a cell detected in the past, terminal 200 may perform the cell selection based on these pieces of information (Cell selection by leveraging stored information). In this case, terminal 200 need not search the plurality of NR frequency bands.

When a suitable cell (e.g., cell that satisfies cell-selection criteria and allows access of terminal 200) is found, terminal 200 selects (Camps on) this cell.

As the cell-selection criteria, for example, it is specified that the following Expression 8 is satisfied:

$$Srxlev > 0 \text{ AND } \mathrm{Squal} > 0. \quad \text{(Expression 8)}$$

Here, Srxlev is a received-power level (e.g., represented by [dB]) related to the cell selection, and Squal is a received-quality level (e.g., represented by [dB]) related to the cell selection, which may be given by the following Expressions 9 and 10, respectively.

$$Srxlev = Qr_{xlevmeas} - (Q_{rxlevmin} + Q_{rxlevminoffset}) - Pcompensation - Qoffset_{temp}; \text{ and} \quad \text{(Expression 9)}$$

$$\mathrm{Squal} = Q_{qualmeas} - (Q_{qualmin} + Q_{qualminoffset}) - Qoffset_{temp}. \quad \text{(Expression 10)}$$

In Expression 9, $Q_{rxlevmeas}$ is a received power (e.g., RSRP) measured by terminal 200, $Q_{rxlevmin}$ is a minimum required received power (e.g., represented by [dBm]), $Q_{rxlevminoffset}$ is an offset value with respect to $Q_{rxlevmin}$, Pcompensation is a correction value related to uplink transmission power capability of terminal 200 (e.g., represented by [dB]), and $\mathrm{Qoffset}_{temp}$ is an offset value applied temporarily (e.g., represented by [dB]). Further, in Expression 10. $Q_{qualmeas}$ is a received quality (e.g., RSRQ) measured by terminal 200, $Q_{qualmin}$ is a minimum required received quality (e.g., represented by [dB]), and $Q_{qualminoffset}$ is an offset value with respect to $Q_{qualmin}$.

For example, "$Q_{rxlevminoffset}$" and "$Q_{qualminoffset}$" in Expressions 9 and 10 may be applied to a measurement result of high-priority PLMN when terminal 200 selects VPLMN.

Meanwhile, terminal 200 may perform processing for the cell-reselection after selecting (Camping on) a cell by the cell selection.

The minimum required received power (e.g., $Q_{rxlevmin}$), the minimum required received quality (e.g., $Q_{qualmin}$), the offset value (e.g., $Q_{rxlevminoffset}$ and $Q_{qualminoffset}$), and the correction value (Pcompensation), each of which is a parameter for the cell selection and the cell reselection, may be transmitted (i.e., signaled or configured) from base station 100 to terminal 200 by broadcast information (e.g., SIB), for example.

For example, the minimum required received power, $Q_{rxlevmin}$, and the minimum required received quality, $Q_{qualmin}$, may be respectively indicated to terminal 200 by first parameters "q-RxLevMin" and "q-RxQualMin" that are transmitted by the SIB.

Further, for example, when terminal 200 supports the SUL frequency, terminal 200 may configure a parameter "q-RxLevMinSUL" for the SUL frequency, which is indicated to terminal 200 separately from q-RxLevMin that is the first parameter, as $Q_{rxlevmin}$ for calculation of the cell-selection criteria (e.g., Expression 9).

Further, for example, in a case where terminal 200 does not satisfy the cell-selection criteria using q-RxLevMin or q-RxLevMinSUL described above, terminal 200 may configure a second parameter "q-RxLevMin2," which is indicated separately from the first parameter, q-RxLevMin, and the parameter for the SUL frequency, q-RxLevMinSUL, as $Q_{rxlevmin}$ for calculation of cell-selection criteria (e.g., Expression 9).

Here, terminal 200 capable of configuring the second parameter, q-RxLevMin2, as $Q_{rxlevmin}$ for the cell-selection criteria calculation may be specified as terminal 200 having function A (e.g., coverage-enhancement function), for example. When terminal 200 satisfies the cell-selection criteria using the second parameter, for example, terminal 200 may determine to operate in an operation mode (e.g., coverage-enhancement mode) corresponding to the second parameter.

Further, for example, in a case where terminal 200 does not satisfy the cell-selection criteria using the first parameter and the second parameter described above, terminal 200 may configure a third parameter "q-RxLevMin3." which is indicated separately from the first parameter the second parameter, as $Q_{rxlevmin}$ for calculation of cell-selection criteria (e.g., Expression 9).

Here, terminal 200 capable of configuring the third parameter, q-RxLevMin3, as $Q_{rxlevmin}$ for the cell-selection criteria calculation may be specified as terminal 200 having function A (e.g., coverage-enhancement function) and function B (2-step RACH operation), for example. When terminal 200 satisfies the cell-selection criteria using the third parameter, for example, terminal 200 may determine to operate in an operation mode (e.g., coverage-enhancement mode and 2-step RACH operation) corresponding to the third parameter.

Note that terminal 200 capable of configuring the third parameter, q-RxLevMin3, as $Q_{rxlevmin}$ for the cell-selection criteria calculation is not limited to the above-described example, and a terminal with another combination of the functions, the types, and the operation modes of terminal 200 is possible (e.g., RedCap-terminal having function A).

The second and third parameters are not limited to the parameter corresponding to the minimum required received power, $Q_{rxlevmin}$, in Expression 9 described above, and may be configured, with respect to the calculation of the cell-selection criteria, Srxlev, in Expression 9, for example, as an offset-value, $Q_{offset2or3}$, expressed by the following Expression 11:

$$S_{rxlev} = Q_{rxlevmeas} - (Q_{rxlevmin} + Q_{offset2or3} + Q_{rxlevminoffset}) - Pcompensation - Qoffset_{temp}. \quad \text{(Expression 11)}$$

Further, terminal 200 may perform cell selection on the basis of the cell-selection criteria using at least one of the second parameter and the third parameter, without applying the cell-selection criteria using the first parameter.

Further, although an example has been given in which the second and third parameters are introduced to the cell-selection criteria on the basis of RSRP (e.g., Srxlev), the present disclosure is not limited to this. For example, in the present embodiment, the second and third parameters may be introduced to the cell-selection criteria on the basis of RSRP (e.g., Srxlev) as well as to the cell-selection criteria on the basis of RSRQ (e.g., Squal). Also, for example, the second and third parameters may be introduced to either or both of the cell-selection criteria on the basis of RSRP (e.g., Srxlev) and the cell-selection criteria on the basis of RSRQ (e.g., Squal).

Further, the second and third parameters may be a parameter for a received power such as the minimum required received power. $Q_{rxlevmin}$, or a parameter for a received quality such as the minimum required received quality, $Q_{qualmin}$. The second and third parameters may be, for example, other parameters such as offset values, $Q_{rxlevminoffset}$, $Q_{qualminoffset}$, and $Qoffset_{temp}$, or a correction value, Pcompensation, which are used for determination of the cell-selection criteria.

The above-mentioned second and third parameters, q-RxLevMin2 and q-RxLevMin3, are exemplary. For example, "q-RxLevMinCovEnh" may be indicated to terminal 200 having the coverage-enhancement function, "q-RxLevMinRedCap" may be indicated to a RedCap-terminal, "q-RxLevMinCovEnh_2SR" may be indicated to a terminal having the coverage-enhancement function and the 2-step RACH function, and "q-RxLevMinRedCap_CovEnh" may be indicated to a RedCap-terminal having the coverage function, that is, the second and third parameters may be configured for each combination of the functions of terminal 200 and/or the types of terminal 200.

FIG. 7 illustrates examples of parameters "q-RxLevMin" for the cell-selection criteria corresponding to the coverage-enhancement function and the 2-step RACH function, by way of example. As illustrated in FIG. 7, the parameter for the cell-selection criteria may be configured in accordance with each combination of the presence (CovEnh: Yes (corresponding to "O" in FIG. 7)) or absence (CovEnh: No (corresponding to "×" in FIG. 7)) of the coverage-enhancement function, and the presence (2-step RACH: Yes) or absence (2-step RACH: No) of the 2-step RACH function.

Incidentally, in FIG. 7, for terminal 200 having the 2-step RACH function and not having the coverage-enhancement function (2-step RACH: Yes, CovEnh: No), a parameter (e.g., $Q_{rxlevmin\_2SR}$), which is indicated separately from the first parameter (e.g., $Q_{rxlevmin}$), may be configured, or the first parameter (e.g., $Q_{rxlevmin}$) may be configured. In other words, among combinations of the functions of terminal 200 and/or the types of terminal 200, there may be a combination for which the first parameter same as that for the existing terminal is configured.

Further, there may be plural levels of the cell-selection criteria (i.e., parameter candidates for cell-selection criteria) that can be used by some of terminals 200, for each combination of the functions of terminal 200 and/or the types of terminal 200.

When a suitable cell is found, terminal 200 may select (Camp on) this cell and start an initial-access operation (e.g., random access operation), for example.

The exemplary operation for the cell selection in terminal 200 has been described, thus far.

Next, an exemplary operation after terminal 200 selects (Camps on) a cell will be described.

As in Embodiment 1, terminal 200 may, for example, control the initial-access operation based on a determination result of the cell selection (e.g., whether cell-selection criteria are satisfied). For example, as in Embodiment 1, terminal 200 may control the RACH resource configuration, the PO configuration, or the random access operation in accordance with a parameter (e.g., first parameter, second parameter, or third parameter) applied when the above-mentioned cell-selection criteria are satisfied.

<Example of RACH Resource Configuration>

As in Embodiment 1, terminal 200 may, for example, determine a RACH resource to be applied in the initial access, based on the parameter applied when the cell-selection criteria are satisfied. For example, the RACH resource or a RACH preamble may be different for each parameter that is applied to the cell-selection criteria.

Meanwhile, the RACH resource may be configured based on, for example, a difference (gap) between the cell-selection criteria, Srxlev, calculated by the first parameter and the cell-selection criteria, Srxlev, calculated by the second (or second or later) parameter, not limited to being configured based on a value of the parameter applied to cell-selection criteria. For example, a RACH resource or a RACH preamble may be configured for each of the cases where a difference between the cell-selection criteria, Srxlev, respectively corresponding to the first parameter and the second parameter is equal to or less than a threshold (for example, X dB) and where the difference is greater than threshold X dB. Incidentally, the present disclosure is not limited to a difference in cell-selection criteria, Srxlev, between the first parameter and another parameter, and a difference in the cell-selection criteria, Srxlev, between the second parameter and a parameter later than the second parameter may be used.

Further, the parameter configured in accordance with the parameter applied when the cell-selection criteria are satisfied is not limited to the RACH resource and may be (or in addition to RACH resource) the number of Repetitions at the time of Msg.3 transmission. For example, the number of Repetitions at the time of Msg.3 transmission may be individually configured (e.g., to be different value) for the cases satisfying cell-selection criteria calculated by the first parameter, the second parameter, and the third parameter, respectively. Further, for example, when there are plural levels of the cell-selection criteria that can be used by some of terminals 200, the number of Repetitions for Msg.3 Repetition may be varied in accordance with the respective levels.

The number of Repetitions for Msg.3 Repetition may be configured based on a difference between the cell-selection criteria, $S_{rxlev}$, calculated by the first parameter and the cell-selection criteria, $S_{rxlev}$, calculated by the second (or second or later) parameter.

<Example of RACH Operation>

As in Embodiment 1, terminal 200 may, for example, determine a RACH operation to be applied, based on the parameter applied when the cell-selection criteria are satisfied. For example, the RACH operation may be different for each parameter applied to the cell-selection criteria.

Further, for example, the number of RACH Repetitions in the RACH operation may be varied based on the parameter applied to cell-selection criteria, as in Embodiment 1.

<Example of Paging Resource Configuration>

As in Embodiment 1, terminal 200 may, for example, determine a resource in which a paging signal is received (e.g., PO), based on the parameter applied when the cell-selection criteria are satisfied. For example, the PO may be different for each parameter that is applied to the cell-selection criteria.

Meanwhile, the PO configuration (e.g., the presence of absence of Repetition or the number of Repetitions) may be based on, for example, a difference (gap) between the cell-selection criteria, Srxlev, calculated by the first parameter and the cell-selection criteria, Srxlev, calculated by the second (or second or later) parameter, not limited to being based on the parameter applied to cell-selection criteria.

The exemplary operation after terminal 200 selects (Camps on) a cell has been described, thus far.

The above-described configuration examples or operation examples may be combined. By way of example, terminal 200 may control, in accordance with the parameter satisfying cell-selection criteria, at least one of the RACH resource, the paging resource (PO), the number of Repetitions for a signal (e.g., at least one of Msg.3, RACH, and paging signal), or the RACH operation, which have been mentioned above.

Further, with respect to cell-reselection criteria, a parameter for cell-reselection criteria used for the cell reselection may be configured for each function of a terminal, each type of a terminal, or each operation mode of a terminal, as in the cell-selection criteria mentioned above.

In the present embodiment, for example, in the processing of ST106 in the flowchart illustrated in FIG. 6, terminal 200 may calculate cell-selection criteria using a parameter configured for each combination of the functions of terminal 200, the types of terminal 200, and/or the operation modes of terminal 200.

The exemplary operations of base station 100 and terminal 200 have been each described, thus far.

Thus, in the present embodiment, terminal 200 receives a parameter for the cell selection, which is configured based on a combination of at least two of a function or functions, a type or types, and/or an operation mode or operation modes of terminal 200, and then performs the cell-selection processing based on the received parameter. This processing allows terminal 200 to, for example, perform the cell selection by using the cell-selection criteria configured for each combination of functions, types, and/or operation modes of terminal 200.

Thus, according to the present embodiment, for example, terminal 200 in the IDLE state or the INACTIVE state can select a suitable cell by the cell selection or the cell reselection in accordance with a combination of functions, types, or operation modes of terminal 200.

In addition, for example, the random access operation or the RACH resource is determined in accordance with a combination of the parameters applied when terminal 200 satisfies cell-selection criteria. This allows base station 100 to, for example, recognize the function, the type, or the operation mode of terminal 200 by receiving a random access signal, and to perform scheduling appropriately for this terminal 200 in subsequent initial accesses (e.g., Msg.2, Msg.B, and Msg.3).

Further, according to the present embodiment, for example, with respect to cell-selection criteria, a parameter used for the cell-selection criteria is configured corresponding to various functions in NR such as the coverage enhancement, the two-stage random access, the four-stage random access, or supporting the SUL frequency, and various terminal-types such as a low-cost terminal (e.g., RedCap-terminal); hence, terminal 200 can appropriately perform the cell selection in accordance with a combination of functions, types, and/or operation modes of terminal 200.

According to the present embodiment, it is possible to improve the cell-selection efficiency in radio communication.

Embodiment 3

Configurations of base station 100 and terminal 200 according to the present embodiment may be the same as the configurations in Embodiment 1.

In the present embodiment, a description will be given of, when a plurality of parameters for cell-selection criteria is indicated to terminal 200 in the cell selection by terminal 200, a method to determine a priority or an order of application to the cell selection (e.g., cell-selection criteria) for the plurality of parameters.

In the following, examples of cell selection methods (Option 1 and Option 2) according to the present embodiment will be described.

[Option 1]

In Option 1, when a plurality of parameters for cell-selection criteria is indicated to terminal 200, terminal 200 may determine whether to satisfy the cell-selection criteria by applying the parameters in accordance with the configured priority or order to calculate the cell-selection criteria, for example.

Incidentally, a priority or order for a plurality of parameters may be previously determined for terminal 200 or may be indicated (or configured) from base station 100, for example.

By way of example, when parameters for cell-selection criteria that can be used by terminal 200 having function A (e.g., coverage-enhancement function) and function B (e.g., 2-step RACH function) are indicated by "q-RxLevMinA" and "q-RxLevMinB," respectively, terminal 200 having function A and function B may determine whether to satisfy the cell-selection criteria by preferentially applying the cell-selection criteria with q-RxLevMinB applied; thereafter, when the cell-selection criteria calculated by q-RxLevMinB are not satisfied, by calculating the cell-selection criteria with q-RxLevMinA applied.

In other words, the parameter corresponding to function B has a higher priority than that of the parameter corresponding to function A, and thus, terminal 200 may perform the cell selection according to the order of the parameter corresponding to function B and the parameter corresponding to function A.

Note that the operation of Option 1 may include, for example, the operations of the calculation of the cell-selection criteria by using the first parameter and the calculation of the cell-selection criteria by using the second parameter when the cell-selection criteria with the first parameter applied are not satisfied, in Embodiment 1 described above. In other words, the previously determined order may be configured in the order of the cell selection by RxLevMinA, the cell selection by q-RxLevMinB, and the cell selection by q-RxLevMin.

[Option 2]

In Option 2, when a plurality of parameters for cell-selection criteria is indicated to terminal 200, terminal 200 may determine an order based on values of the parameters, for example. Terminal 200 may determine whether to satisfy the cell-selection criteria by applying the parameters in accordance with the determined order to calculate the cell-selection criteria, for example.

By way of example, terminal 200 may determine whether to satisfy the cell-selection criteria by applying the parameters in descending order of the values of the parameters to be each applied as a value of $Q_{rxlevmin}$ and calculating the cell-selection criteria.

As an example, a case will be described where parameters for cell-selection criteria that can be used by terminal 200 having function A (e.g., coverage-enhancement function) and function B (e.g., 2-step RACH function) are indicated by "q-RxLevMinA=X dB" and "q-RxLevMinB=Y dB," respectively, and where X<Y. In this case, terminal 200 having function A and function B may determine whether to satisfy the cell-selection criteria by preferentially applying the cell-selection criteria to which q-RxLevMinB having a larger parameter value than that of q-RxLevMinA is applied, and, when the cell-selection criteria calculated by q-RxLevMinB are not satisfied, by calculating the cell-selection criteria with q-RxLevMinA applied.

Note that the order of the parameters applied to the cell-selection criteria is not limited to the descending order of the values of the parameters and may be in the ascending order.

Option 1 and Option 2 have been each described, thus far.

Next, a description will be given of an exemplary operation for the cell selection according to the present embodiment.

In the following, as an example, an operation for the cell selection in terminal 200 having function A (e.g., coverage-enhancement function) and function B (e.g., 2-step RACH function) will be described. Additionally, a case will be described below where the parameter, q-RxLevMin2, corresponding to function A and the parameter, q-RxLevMin3, corresponding to function B are indicated to terminal 200, and a priority of q-RxLevMin3 is higher than that of q-RxLevMin2. Therefore, terminal 200 preferentially applies the cell-selection criteria with q-RxLevMin3 applied, by the method in Option 1 or Option 2, for example.

For example, in an initial cell selection of terminal 200 in the IDLE state, terminal 200 may search (scan) a plurality of (e.g., all of) RF channels (or frequencies) in an NR band, in accordance with the RF capability of this terminal 200. For example, terminal 200 may search for a stronger cell (e.g., strongest cell) at each RF channel (frequency).

Alternatively, for example, in a case where terminal 200 has information on measurement control information received in the past or information on a frequency or a cell parameter that is obtained from a cell detected in the past, terminal 200 may perform the cell selection based on these pieces of information (Cell selection by leveraging stored information). In this case, terminal 200 need not search the plurality of NR frequency bands.

When a suitable cell (e.g., cell that satisfies cell-selection criteria and allows access of terminal 200) is found, terminal 200 selects (Camps on) this cell.

As the cell-selection criteria, for example, it is specified that the following Expression 12 is satisfied:

$$Srxlev > 0 \text{ AND } \mathrm{Squal} > 0. \quad \text{(Expression 12)}$$

Here, Srxlev is a received-power level (e.g., represented by [dB]) related to the cell selection, and Squal is a received-quality level (e.g., represented by [dB]) related to the cell selection, which may be given by the following Expressions 13 and 14, respectively.

$$Srxlev = Qr_{xlevmeas} - (Q_{rxlevmin} + Q_{rxlevminoffset}) - Pcompensation - Qoffset_{temp}; \text{ and} \quad \text{(Expression 13)}$$

$$\mathrm{Squal} = Q_{qualmeas} - (Q_{qualmin} + Q_{qualminoffset}) - Qoffset_{temp}. \quad \text{(Expression 14)}$$

In Expression 13, $Q_{rxlevmeas}$ is a received power (e.g., RSRP) measured by terminal 200, $Q_{rxlevmin}$ is a minimum required received power (e.g., represented by [dBm]), $Q_{rxlevminoffset}$ is an offset value with respect to $Q_{rxlevmin}$, Pcompensation is a correction value related to uplink transmission power capability of terminal 200 (e.g., represented by [dB]), and $Qoffset_{temp}$ is an offset value applied temporarily (e.g., represented by [dB]). Further, in Expression 14, $Q_{qualmeas}$ is a received quality (e.g., RSRQ) measured by terminal 200, $Q_{qualmin}$ is a minimum required received quality (e.g., represented by [dB]), and $Q_{qualminoffset}$ is an offset value with respect to $Q_{qualmin}$.

For example, "$Q_{rxlevminoffset}$" and "$Q_{qualminoffset}$" in Expressions 13 and 14 may be applied to a measurement result of high-priority PLMN when terminal 200 selects VPLMN.

Meanwhile, terminal 200 may perform processing for the cell-reselection after selecting (Camping on) a cell by the cell selection.

The minimum required received power (e.g., $Q_{rxlevmin}$), the minimum required received quality (e.g., $Q_{qualmin}$), the offset value (e.g., $Q_{rxlevminoffset}$ and $Q_{qualminoffset}$), and the correction value (Pcompensation), each of which is a parameter for the cell selection and the cell reselection, may be transmitted (i.e., signaled or configured) from base station 100 to terminal 200 by broadcast information (e.g., SIB), for example.

For example, the minimum required received power, $Q_{rxlevmin}$, and the minimum required received quality, $Q_{qualmin}$, may be respectively indicated to terminal 200 by first parameters "q-RxLevMin" and "q-RxQualMin" that are transmitted by the SIB.

Further, for example, when terminal 200 supports the SUL frequency, terminal 200 may configure a parameter "q-RxLevMinSUL" for the SUL frequency, which is indicated to terminal 200 separately from q-RxLevMin that is the first parameter, as $Q_{rxlevmin}$ for calculation of the cell-selection criteria (e.g., Expression 13).

Further, for example, in a case where terminal 200 does not satisfy the cell-selection criteria using q-RxLevMin or q-RxLevMinSUL described above, terminal 200 may configure a third parameter "q-RxLevMin3," which has a high priority and is indicated separately from the first parameter, q-RxLevMin, and the parameter for the SUL frequency, q-RxLevMinSUL, as $Q_{rxlevmin}$ for calculation of cell-selection criteria (e.g., Expression 13).

Here, terminal 200 capable of configuring the third parameter, q-RxLevMin3, as $Q_{rxlevmin}$ for the cell-selection criteria calculation may be specified as terminal 200 having function B (2-step RACH operation), for example. When terminal 200 satisfies the cell-selection criteria using the third parameter, for example, terminal 200 may determine to operate in an operation mode (e.g., 2-step RACH operation) corresponding to the third parameter.

Further, for example, in a case where terminal 200 does not satisfy the cell-selection criteria using the first parameter and the third parameter described above, terminal 200 may configure a second parameter "q-RxLevMin2," which has a low priority and is indicated separately from the first parameter the third parameter, as $Q_{rxlevmin}$ for calculation of cell-selection criteria (e.g., Expression 13).

Here, terminal 200 capable of configuring the second parameter, q-RxLevMin2, as $Q_{rxlevmin}$ for the cell-selection criteria calculation may be specified as terminal 200 having function A (e.g., coverage-enhancement function), for example. When terminal 200 satisfies the cell-selection criteria using the second parameter, for example, terminal 200 may determine to operate in an operation mode (e.g., coverage-enhancement mode) corresponding to the second parameter.

The second and third parameters are not limited to the parameter corresponding to the minimum required received power, $Q_{rxlevmin}$, in Expression 12 described above, and may be configured, with respect to the calculation of the cell-selection criteria, Srxlev, in Expression 13, for example, as an offset-value, $Q_{offset2or3}$, expressed by the following Expression 15:

$$Srxlev = Q_{rxlevmeas} - (Q_{rxlevmin} + Q_{offset2or3} + Q_{rxlevminoffset}) - Pcompensation - Qoffset_{temp}. \quad \text{(Expression 15)}$$

Further, terminal 200 may perform cell selection on the basis of the cell-selection criteria using the second parameter and the third parameter, without applying the cell-selection criteria using the first parameter.

Further, although a case has been given in which the second and third parameters are introduced to the cell-selection criteria on the basis of RSRP (e.g., Srxlev), the present disclosure is not limited to this. For example, in the present embodiment, the second and third parameters may be introduced to the cell-selection criteria on the basis of RSRP (e.g., Srxlev) as well as to the cell-selection criteria on the basis of RSRQ (e.g., Squal). Also, for example, the second and third parameters may be introduced to either or both of the cell-selection criteria on the basis of RSRP (e.g., Srxlev) and the cell-selection criteria on the basis of RSRQ (e.g., Squal).

Further, the second and third parameters may be a parameter for a received power such as the minimum required received power, $Q_{rxlevmin}$, or a parameter for a received quality such as the minimum required received quality, $Q_{qualmin}$. The second and third parameters may be, for example, other parameters such as offset values, $Q_{rxlevminoffset}$, $Q_{qualminoffset}$, and $Qoffset_{temp}$, or a correction value. Pcompensation, which are used for determination of the cell-selection criteria.

Further, for each of at least one of a function of terminal 200 and a type of terminal 200, there may be plural levels of the cell-selection criteria (i.e., parameter candidates for cell-selection criteria) that can be used by some of terminals 200.

When a suitable cell is found, terminal 200 may select (Camp on) this cell and start an initial-access operation (e.g., random access operation), for example.

The exemplary operation for the cell selection in terminal 200 has been described, thus far.

As in Embodiment 1, terminal 200 may, for example, control the initial-access operation based on a determination result of the cell selection (e.g., whether cell-selection criteria are satisfied). Further, as in Embodiment 1, terminal 200 may control at least one of the RACH resource configuration, the PO configuration, or the random access operation in accordance with a parameter (e.g., first parameter, second parameter, or third parameter) applied when the above-mentioned cell-selection criteria are satisfied.

Further, with respect to cell-reselection criteria, a parameter for cell-reselection criteria used for the cell reselection may be configured for each function of a terminal, each type of a terminal, or each operation mode of a terminal, as in the cell-selection criteria.

Thus, in the present embodiment, terminal 200 receives a parameter for the cell selection, which is configured based on at least one of a function, a type, and an operation mode of terminal 200, and then performs the cell-selection processing based on the received parameter. In addition, terminal 200 determines, for a plurality of parameters used for cell-selection criteria, a priority or order for application to the cell selection. This processing allows terminal 200 to, for example, perform the cell selection by using the cell-selection criteria configured for each combination of a function, a type, and an operation mode of terminal 200.

Thus, according to the present embodiment, for example, terminal 200 in the IDLE state or the INACTIVE state can select a suitable cell by the cell selection or the cell reselection in accordance with a function, a type, or an operation mode of terminal 200.

In addition, for example, the random access operation or the RACH resource is determined in accordance with the parameter applied when terminal 200 satisfies cell-selection criteria. This allows base station 100 to, for example, recognize the function, the type, or the operation mode of terminal 200 by receiving a random access signal, and to perform scheduling appropriately for this terminal 200 in subsequent initial accesses (e.g., Msg.2, Msg.B, and Msg.3).

Further, according to the present embodiment, for example, with respect to cell-selection criteria, a parameter used for the cell-selection criteria and a priority or order of the parameters are configured corresponding to various functions in NR such as the coverage enhancement, the two-stage random access, the four-stage random access, or supporting the SUL frequency, and various terminal-types such as a low-cost terminal (e.g., RedCap-terminal); hence, terminal 200 can appropriately perform the cell selection in accordance with a combination of functions, types, and/or operation modes of terminal 200.

According to the present embodiment, it is possible to improve the cell-selection efficiency in radio communication.

Embodiment 4

Configurations of base station 100 and terminal 200 according to the present embodiment may be the same as the configurations in Embodiment 1.

In NR, for example, a reference signal (e.g., SSS and PBCH DMRS) included in a synchronization signal block (SS/PBCH block) is used to measure RSRP.

In the present embodiment, for example, a description will be given of a method to calculate cell-selection criteria in multi-beam operating where transmission beamforming is applied to the SS/PBCH block. For example, in the present embodiment, a parameter for cell-selection criteria may be a parameter for reception of a synchronization signal (e.g., SS/PBCH block) to which the beamforming is applied.

For example, a first parameter that can be used for the cell-selection criteria by an existing terminal and a plurality of (e.g., all of) terminals for NR may be indicated to terminal 200 by "nrofSS-BlocksToAverage" and "absThreshSS-BlocksConsolidation," and a second parameter that can be used for the cell-selection criteria by some of terminals 200 (e.g., terminal 200 having coverage-enhancement function) may be indicated to terminal 200 by "nrofSS-BlocksToAverage2" and "absThreshSS-BlocksConsolidation2."

Each of "nrofSS-BlocksToAverage" and "nrofSS-BlocksToAverage2" may indicate, for example, the number of beams (or SS blocks) that averages measurement values. Meanwhile, each of "absThreshSS-BlocksConsolidation" and "absThreshSS-BlocksConsolidation2" may indicate a threshold for averaging (or integrating) the measurement values.

For example, in any of Embodiments 1, 2, and 3, when a cell for which RSRP or RSRQ will be measured performs multi-beam operation, terminal 200 may determine a beam satisfying the following criteria as a measurement target.

For example, in a situation where the cell-selection criteria using the first parameter are calculated, when nrofSS-BlocksToAverage and absThreshSS-BlocksConsolidation are configured by the SIB and there is a measurement value of a beam exceeding the value of absThreshSS-BlocksConsolidation, terminal 200 may average measurement values of the number of beams for nrofSS-BlocksToAverage, which have larger values among the beams exceeding the value of absThreshSS-BlocksConsolidation, thereby calculating RSRP or RSRQ of the cell.

On the other hand, for example, in the case where no nrofSS-BlocksToAverage is configured by the SIB, where no absThreshSS-BlocksConsolidation is configured by the SIB, or where there is no measurement value of a beam exceeding the value of absThreshSS-BlocksConsolidation, terminal 200 may configure, as RSRP or RSRQ of the cell, a higher measurement value (e.g., highest measurement value) of the measurement values of the beams.

For example, when a cell for which RSRP or RSRQ will be measured performs multi-beam operation, terminal 200 may determine a beam satisfying the following criteria as a measurement target, in cell-selection criteria calculated using the second (or second or later) parameter.

For example, when nrofSS-BlocksToAverage2 and absThreshSS-BlocksConsolidation2 are configured by the SIB and there is a measurement value of a beam exceeding the value of absThreshSS-BlocksConsolidation2, terminal 200 may average measurement values of the number of beams for nrofSS-BlocksToAverage2, which have larger values among the beams exceeding the value of absThreshSS-BlocksConsolidation2, thereby calculating RSRP or RSRQ of the cell.

On the other hand, for example, in the case where no nrofSS-BlocksToAverage2 is configured by the SIB, where no absThreshSS-BlocksConsolidation2 is configured by the SIB, or where there is no measurement value of a beam exceeding the value of absThreshSS-BlocksConsolidation2, terminal 200 may configure, as RSRP or RSRQ of the cell, a higher measurement value (e.g., highest measurement value) of the measurement values of the beams.

Incidentally, the second parameters, nrofSS-BlocksToAverage2 and absThreshSS-BlocksConsolidation2, that can be used for the cell-selection criteria are exemplary, and the parameters are not limited to these. For example, "nrofSS-BlocksToAverageCovEnh" and "absThreshSS-BlocksConsolidationCovEnh" may be indicated to terminal 200 having the coverage-enhancement function, and "nrofSS-BlocksToAverageRedCap" and "absThreshSS-BlocksConsolidationRedCap" may be indicated to a RedCap-terminal, that is, the second parameter may be configured for a function of terminal 200, a type of the terminal, or an operation mode of terminal, or a combination thereof.

Further, in the present embodiment, for example, with respect to at least one of nrofSS-BlocksToAverage2 and absIhreshSS-BlocksConsolidation2, the second parameter may be configured for a function, a type, or an operation mode of terminal 200, or a combination thereof.

Further, there may be plural levels of the cell-selection criteria (i.e., parameter candidates for cell-selection criteria) that can be used by some of terminals 200, for each combination of the functions of terminal 200 and/or the types of terminal 200. In one example, when a plurality of parameters (or parameter candidates) are configured for at least one of nrofSS-BlocksToAverage2 and absThreshSS-BlocksConsolidation2, the priority or order of the plurality of parameters may be configured, as in Embodiment 3.

Further, with respect to cell-reselection criteria, a parameter for the cell-reselection criteria used for the cell reselection may be configured for a function, a type, or an operation mode of terminal 200, or a combination thereof, as in the cell-selection criteria.

Thus, according to the present embodiment, for example, terminal 200 in the IDLE state or the INACTIVE state can select, even for a multi-beam operating cell, a suitable cell by the cell selection or the cell reselection in accordance with a function, a type, or an operation mode of terminal 200.

Embodiment 5

Configurations of base station 100 and terminal 200 according to the present embodiment may be the same as the configurations in Embodiment 1.

In the present embodiment, a description will be given of a method to control a transmission power during an initial-access operation that is applied in accordance with a parameter applied when cell-selection criteria are satisfied. For example, the transmission-power control during the initial-access operation may be varied in accordance with the parameter applied when the cell-selection criteria are satisfied.

In one example, the transmission-power control method applied in terminal 200 that satisfies the cell-selection criteria using the first parameter and the transmission-power control method applied in terminal 200 that satisfies the cell-selection criteria using the second parameter may be different from each other.

For example, when the cell-selection criteria using the first parameter correspond to the existing coverage, existing transmission-power control (e.g., see NPL 6) is applied, and when the cell-selection criteria using the second parameter correspond to the coverage enhancement, a maximum transmission power (e.g., Pcmax) may be applied.

Note that the transmission-power control method may be configured based on a difference (gap) between the cell-selection criteria, Srxlev, calculated by the first parameter and the cell-selection criteria, Srxlev, calculated by the second (or second or later) parameter. For example, the existing transmission-power control (e.g., see NPL 6) may be applied when the difference between the cell-selection criteria, Srxlev, calculated by the first parameter and the cell-selection criteria, Srxlev, calculated by the second (or second or later) parameter is equal to or less than X [dB], whereas the maximum transmission power (e.g., Pcmax) may be applied when the difference is greater than X [dB].

Further, in the present embodiment, the transmission-power control method is not limited to being configured based on, for example, the above-mentioned parameter used for the cell-selection criteria or the difference between cell-selection criteria, $S_{rxlev}$, and the method may be controlled based on at least one of the RACH resource, the RACH operation, and the number of Repetitions at the time of Msg.3 transmission as described in Embodiment 1.

Incidentally, the transmission power control corresponding to cell-selection criteria using the first and second parameters, respectively, is not limited to the transmission-power control using the existing transmission-power control and the maximum transmission power that have been described above, and may be performed by other methods.

Thus, according to the present embodiment, for example, terminal 200 in the IDLE state or the INACTIVE state can perform an initial-access operation at an appropriate transmission power, in accordance with a function, a type, or an operation mode of terminal 200.

The embodiments according to an exemplary embodiment of the present disclosure have been each described, thus far.

Incidentally, at least two of Embodiments 1 to 5 mentioned above may be combined. By way of example, terminal 200 may apply at least two of the following: a parameter configuration method for cell-selection criteria in any of Embodiments 1 to 3; the cell selection method in the multi-beam operating cell in Embodiment 4; and the transmission power control method in Embodiment 5.

Further, although the description has been given on the premise that a first parameter and a second (or second or later) parameter in the embodiments are indicated to terminal 200 by the SIB, an indication method for at least one of these parameters is not limited to the SIB, and an indication may be made by the MIB, for example. Meanwhile, the first parameter and the second (or second or later) parameter may be indicated by at least one of SIB1, SIB2, and SIB4, among the SIBs.

Further, in the above embodiments, the communication between base station 100 and terminal 200 has been assumed. However, an exemplary embodiment of the present disclosure is not limited to this and may be applied to communication between terminals (e.g., sidelink communication).

Further, in each of the above-described embodiments, the present disclosure is not limited to a case in which a value of the parameter for the cell-selection criteria is indicated from base station 100 to terminal 200, and, for example, information (e.g., index or other control information) associated with the parameter for the cell-selection criteria may be indicated to terminal 200.

Further, in the embodiments described above, as an example, a case has been described of applying the cell-selection criteria based on both of the received-power level and the received-quality level, as in Expression 4, Expression 8, and Expression 12, but the cell-selection criteria are not limited to these and may be criteria based on either of the received-power level or the received quality, for example.

Further, the downlink control channel, the downlink data channel, the uplink control channel, and the uplink data channel are not limited to PDCCH, PDSCH, PUCCH, and PUSCH, respectively, and may be control channels with other names.

Further, in the above-mentioned embodiments, RRC signaling is assumed as higher layer signaling, but it may be replaced with Medium Access Control (MAC) signaling and an indication by DCI that is physical layer signaling.

In addition, the parameters applied in the above-mentioned embodiments are merely exemplary and are not limited to these examples.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink. The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slots, subslots, minislots, or time resource units, such as symbols, Orthogonal Frequency Division Multiplexing (OFDM) symbols, Single Carrier-Frequency Division Multiple Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large latency compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 8:
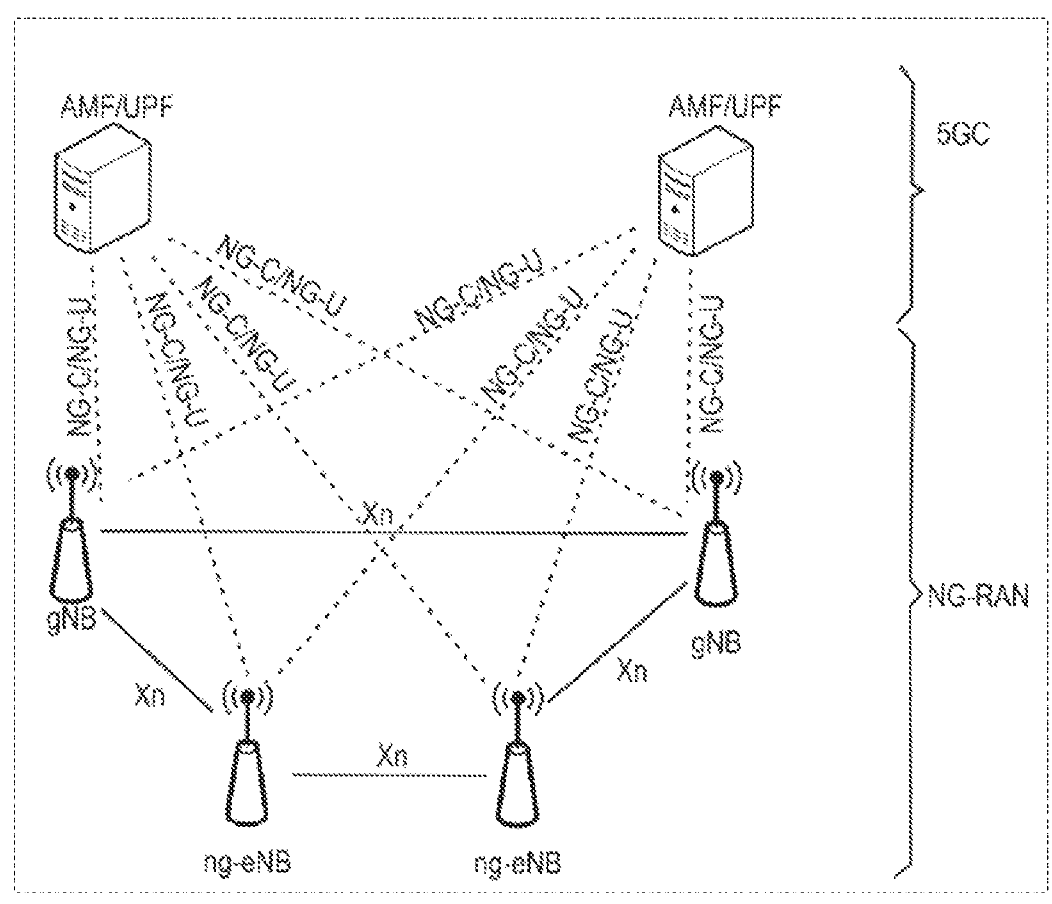
FIG. 8 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 8 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300). RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 9:
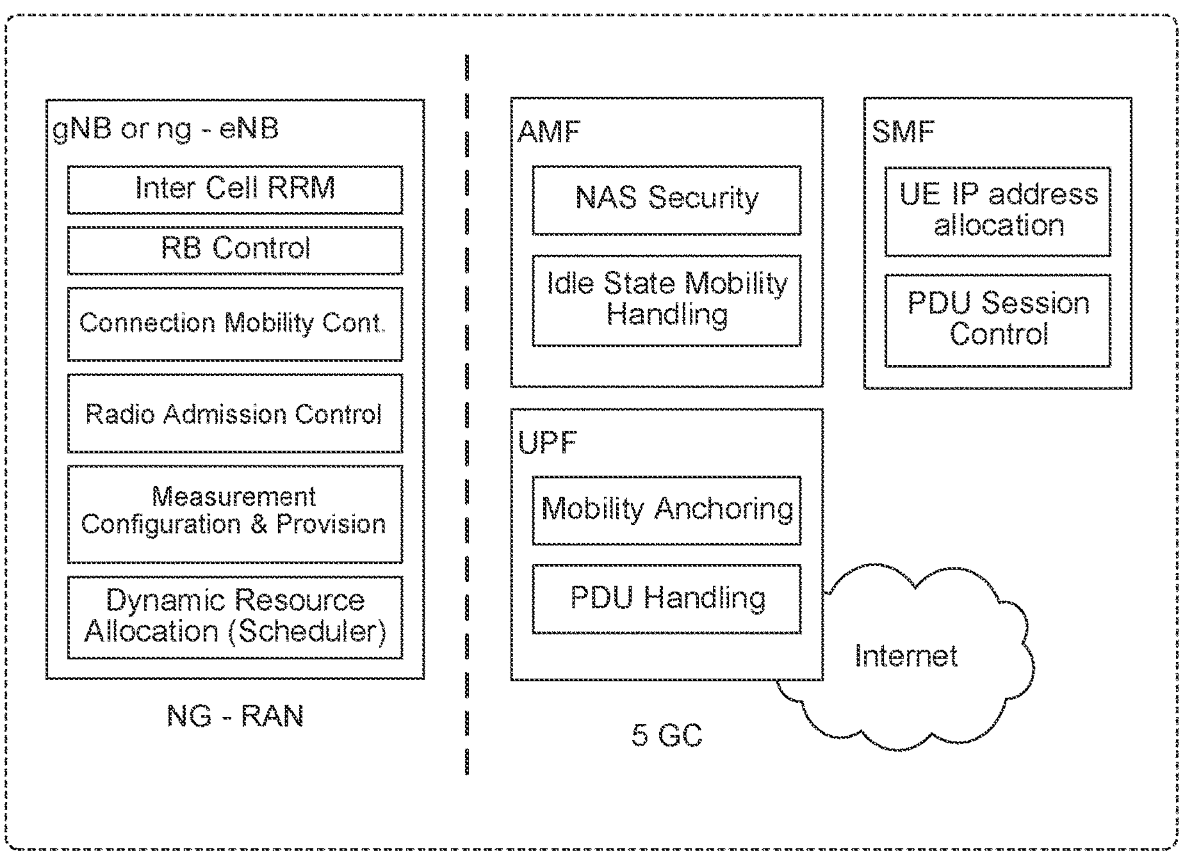
FIG. 9 schematically illustrates a functional split between Next Generation-Radio Access Network (NG-RAN) and 5th Generation Core (5GC)

FIG. 9 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

- Radio Resource Management functions such as Radio Bearer Control, Radio Admission Control, Connection Mobility Control, and dynamic allocation (scheduling) of both uplink and downlink resources to a UE;
- IP header compression, encryption, and integrity protection of data;
- Selection of an AMF during UE attachment in such a case when no routing to an AMF can be determined from the information provided by the UE;
- Routing user plane data towards the UPF;
- Routing control plane information towards the AMF;
- Connection setup and release;
- Scheduling and transmission of paging messages;
- Scheduling and transmission of system broadcast information (originated from the AMF or an operation management maintenance function (OAM: Operation, Admission, Maintenance));
- Measurement and measurement reporting configuration for mobility and scheduling;
- Transport level packet marking in the uplink;
- Session management;
- Support of network slicing;
- QoS flow management and mapping to data radio bearers;
- Support of UEs in the RRC_INACTIVE state;
- Distribution function for NAS messages;
- Radio access network sharing;
- Dual connectivity; and
- Tight interworking between NR and E-UTRA.

The Access and Mobility Management Function (AMF) hosts the following main functions:

- Function of Non-Access Stratum (NAS) signaling termination;
- NAS signaling security;
- Access Stratum (AS) security control;
- Inter-Core Network (CN) node signaling for mobility between 3GPP access networks;
- Idle mode UE reachability (including control and execution of paging retransmission);
- Registration area management;
- Support of intra-system and inter-system mobility;
- Access authentication;
- Access authorization including check of roaming rights;
- Mobility management control (subscription and policies);
- Support of network slicing; and
- Session Management Function (SMF) selection.

In addition, the User Plane Function (UPF) hosts the following main functions:

- Anchor Point for intra-/inter-RAT mobility (when applicable);
- External Protocol Data Unit (PDU) session point for interconnection to a data network;
- Packet routing and forwarding;
- Packet inspection and a user plane part of Policy rule enforcement;
- Traffic usage reporting;
- Uplink classifier to support routing traffic flows to a data network;
- Branching point to support multi-homed PDU session;
- QoS handling for user plane (e.g., packet filtering, gating, UL/DL rate enforcement);
- Uplink traffic verification (SDF to QoS flow mapping): and
- Function of downlink packet buffering and downlink data notification triggering.

Finally, the Session Management Function (SMF) hosts the following main functions:

- Session management;
- UE IP address allocation and management;
- Selection and control of UPF;
- Configuration function for traffic steering at the User Plane Function (UPF) to route traffic to a proper destination;
- Control part of policy enforcement and QoS; and
- Downlink data notification.

<RRC Connection Setup and Reconfiguration Procedure>

Figure 10:
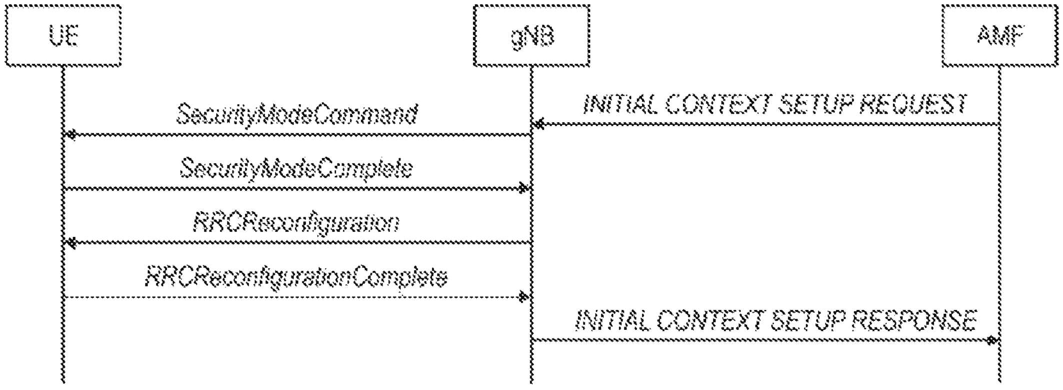
FIG. 10 is a sequence diagram of a Radio Resource Control (RRC) connection setup/reconfiguration procedure.

FIG. 10 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 11:
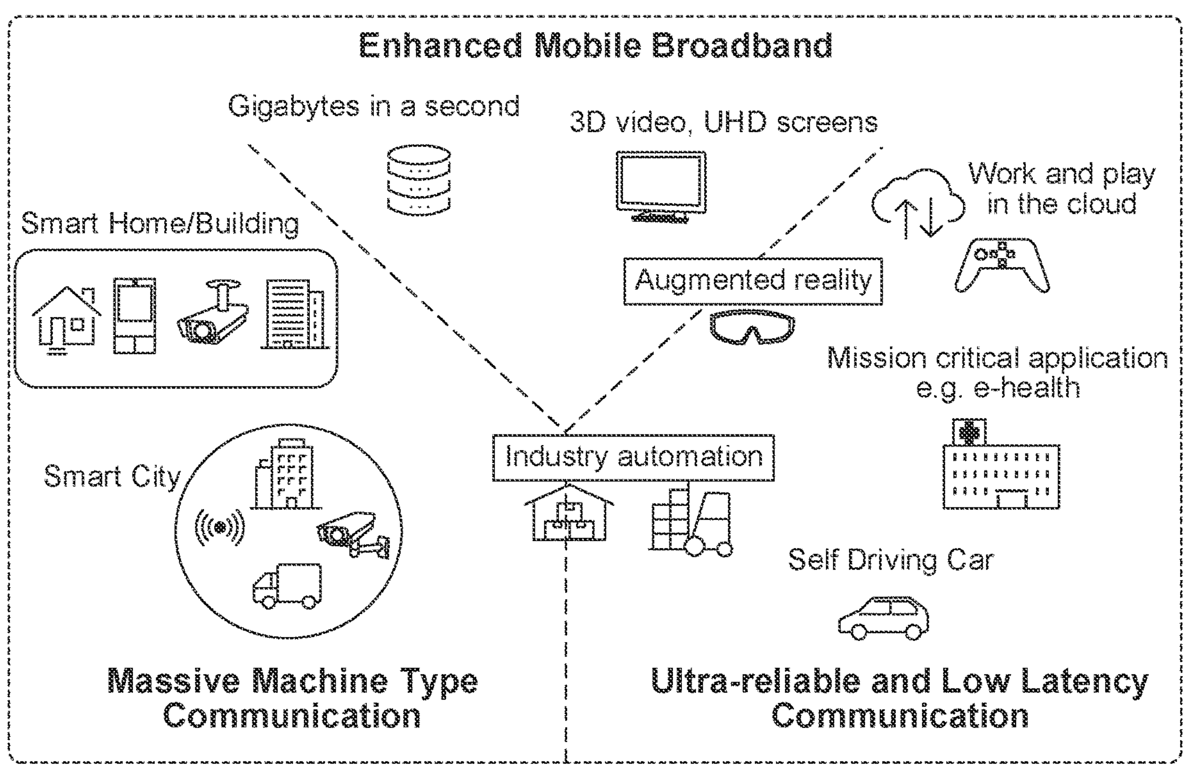
FIG. 11 schematically illustrates usage scenarios of enhanced Mobile BroadBand (eMBB), massive Machine Type Communications (mMTC), and Ultra Reliable and Low Latency Communications (URLLC)

FIG. 11 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 11 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 10. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 12:
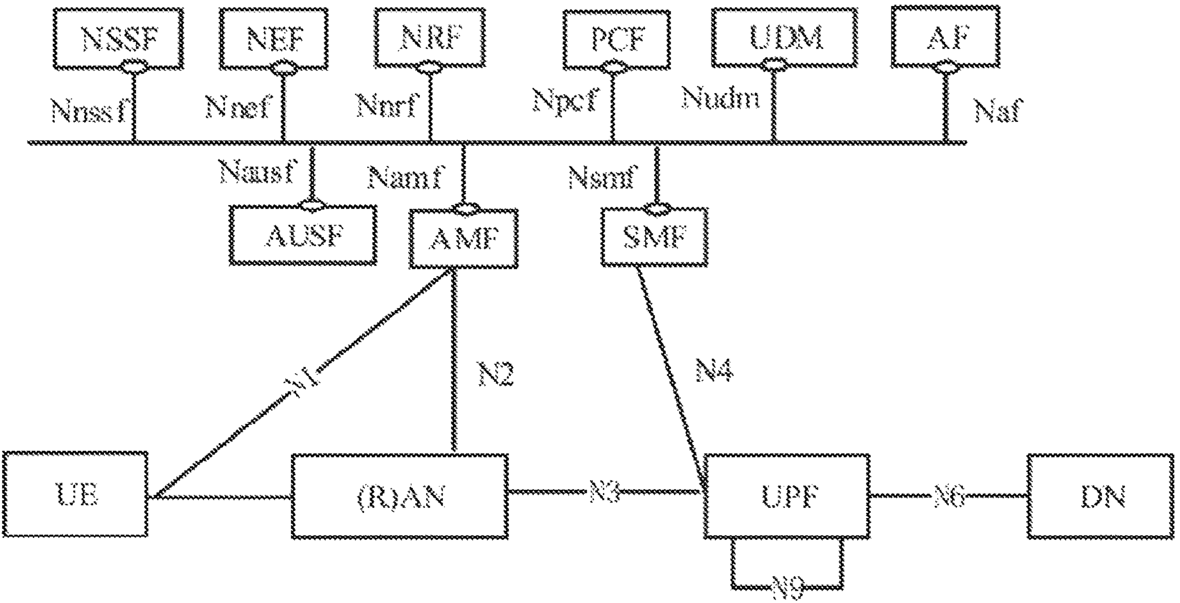
FIG. 12 is a block diagram illustrating an exemplary 5G system architecture for a non-roaming scenario.

FIG. 12 illustrates a 5G NR non-roaming reference architecture (see TS 23.501 v16.1.0, section 4.23). An Application Function (AF) (e.g., an external application server hosting 5G services, exemplarily described in FIG. 11) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 12 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other “things” in a network of an “Internet of Things (IoT).”

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: reception circuitry, which, in operation, receives a parameter relating to cell selection, the parameter being configured based on at least one of a function, a type, and/or an operation mode of the terminal, and control circuitry, which, in operation, performs processing for the cell selection based on the parameter.

In an exemplary embodiment of the present disclosure, the parameter is a parameter relating to a received power.

In an exemplary embodiment of the present disclosure, the parameter is a parameter relating to a received quality.

In an exemplary embodiment of the present disclosure, the parameter is an offset value used for determination of the cell selection.

In an exemplary embodiment of the present disclosure, the parameter is a parameter relating to reception of a synchronization signal to which beamforming is applied.

In an exemplary embodiment of the present disclosure, a plurality of candidates for the parameter is provided.

In an exemplary embodiment of the present disclosure, the control circuitry performs control of an initial-access operation, based on a determination result of the cell selection.

In an exemplary embodiment of the present disclosure, the control circuitry performs the control of the initial-access operation, based on the parameter that satisfies a criterion for the cell selection.

In an exemplary embodiment of the present disclosure, the control circuitry performs the control of the initial-access operation, based on a difference between a plurality of criteria values for the cell selection on the basis of each of a plurality of the parameters different from each other.

In an exemplary embodiment of the present disclosure, the control circuitry determines a resource for a random access channel, in the control of the initial-access operation In an exemplary embodiment of the present disclosure, the control circuitry determines the number of Repetitions for an uplink signal, in the control of the initial-access operation.

In an exemplary embodiment of the present disclosure, the control circuitry controls a transmission power of an uplink signal, in the control of the initial-access operation.

In an exemplary embodiment of the present disclosure, the control circuitry configures the parameter based on a combination of at least two of the function(s), the type(s) and/or the operation mode(s) of the terminal.

In an exemplary embodiment of the present disclosure, the control circuitry determines, for a plurality of the parameters, a priority or an order of application to the cell selection.

A communication method according to an exemplary embodiment of the present disclosure includes: receiving, by a terminal, a parameter relating to cell selection, the parameter being configured based on at least one of a function, a type, and/or an operation mode of the terminal; and performing, by the terminal, processing for the cell selection based on the parameter.

The disclosure of Japanese Patent Application No. 2021-004451, filed on Jan. 14, 2021, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 206 Controller
102, 207 Signal generator
103, 208 Transmitter
104, 201 Receiver
105, 202 Extractor
106, 203 Demodulator
107, 204 Decoder
205 Measurer
200 Terminal

The invention claimed is:

1. A terminal, comprising:

reception circuitry, which, in operation, receives a parameter relating to cell selection, the parameter being configured based on at least one of a function, a type, or an operation mode of the terminal; and control circuitry, which, in operation:

determines whether the terminal supports a Supplemental Uplink (SUL) frequency; and, performs processing for the cell selection based on the parameter, the parameter including a parameter relating to a minimum required received power, wherein in a case where the terminal supports the SUL frequency, the parameter related to the minimum required received power is acquired from a parameter for the SUL frequency transmitted in a System Information Block (SIB), in a case where the terminal does not support the SUL frequency, the parameter relating to the minimum required received power is acquired from a parameter different from the parameter for the SUL frequency transmitted in the SIB, and the control circuitry, in operation, performs processing for cell reselection in a case where the processing for cell selection is performed.

2. The terminal according to claim 1, wherein the parameter includes a parameter relating to a received quality.

3. The terminal according to claim 2, wherein the control circuitry determines to perform the processing for the cell selection in a case where the parameter relating to the received power is greater than zero and the parameter relating to the received quality is greater than zero.

4. The terminal according to claim 1, wherein the parameter includes an offset value used for determination of the cell selection.

5. The terminal according to claim 1, wherein the control circuitry performs control of an initial-access operation based on at least one of (i) a determination result of the cell selection, (ii) the parameter that satisfies a criterion for the cell selection, or (iii) a difference between a plurality of criteria values for the cell selection which are based on different ones of the parameters.

6. The terminal according to claim 5, wherein the control circuitry, in the control of the initial-access operation, determines at least one of (i) a resource for a random access channel, (ii) a number of repetitions for an uplink signal, or (iii) a transmission power of the uplink signal.

7. A communication method, comprising:

receiving, by a terminal, a parameter relating to cell selection, the parameter being configured based on at least one of a function, a type, or an operation mode of the terminal;

determining, by the terminal, whether the terminal supports a Supplemental Uplink (SUL) frequency; and performing, by the terminal, processing for the cell selection based on the parameter, the parameter including a parameter relating to a minimum required received power, wherein in a case where the terminal supports the SUL frequency, the parameter related to the minimum required received power is acquired from a parameter for the SUL frequency transmitted in a System Information Block (SIB), in a case where the terminal does not support the SUL frequency, the parameter relating to the minimum required received power is acquired from a parameter different from the parameter for the SUL frequency transmitted in the SIB, and the method includes performing processing for cell reselection in a case where the processing for cell selection is performed.

8. An integrated circuit, comprising:

reception circuitry, which, in operation, receives a parameter relating to cell selection, the parameter being configured based on at least one of a function, a type, or an operation mode of the terminal; and control circuitry, which, in operation;

determines whether the terminal supports a Supplemental Uplink (SUL) frequency; and performs processing for the cell selection based on the parameter, the parameter including a parameter relating to a minimum required received power, wherein in a case where the terminal supports the SUL frequency, the parameter related to the minimum required received power is acquired from a parameter for the SUL frequency transmitted in a System Information Block (SIB), in a case where the terminal does not support the SUL frequency, the parameter relating to the minimum required received power is acquired from a parameter different from the parameter for the SUL frequency transmitted in the SIB, and the control circuitry, in operation, performs processing for cell reselection in a case where the processing for cell selection is performed.

* * * * *